United States Patent
Child et al.

(10) Patent No.: US 10,635,907 B2
(45) Date of Patent: Apr. 28, 2020

(54) ENHANCED DOORBELL CAMERA INTERACTIONS

(71) Applicant: Vivint, Inc., Provo, UT (US)

(72) Inventors: Michael D. Child, Lehi, UT (US);
Jeremy B. Warren, Draper, UT (US);
Alen L. Peacock, Orem, UT (US);
Michelle Zundel, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/489,052

(22) Filed: Apr. 17, 2017

(65) Prior Publication Data

US 2017/0220872 A1 Aug. 3, 2017

Related U.S. Application Data

(63) Continuation-in-part of application No. 14/596,047, filed on Jan. 13, 2015.

(51) Int. Cl.
*G06K 9/62* (2006.01)
*G06K 11/00* (2006.01)
*G06K 7/00* (2006.01)
*G07C 9/00* (2006.01)
*G06K 9/00* (2006.01)
*G08B 13/196* (2006.01)
*H04N 7/18* (2006.01)

(52) U.S. Cl.
CPC ..... *G06K 9/00771* (2013.01); *G06K 9/00288* (2013.01); *G07C 9/00126* (2013.01); *G08B 13/196* (2013.01); *G08B 13/19656* (2013.01); *H04N 7/186* (2013.01)

(58) Field of Classification Search
CPC .......... G06K 9/00771; G06K 9/00288; G07C 9/00126; H04N 7/186; H04N 5/23229; G08B 13/19656; G08B 13/196
See application file for complete search history.

(56) References Cited

U.S. PATENT DOCUMENTS

| 4,764,953 A | * | 8/1988 | Chern | H04M 11/025 |
| | | | | 379/102.06 |
| 5,184,223 A | | 2/1993 | Mihara | |
| 5,428,388 A | * | 6/1995 | von Bauer | H04N 7/186 |
| | | | | 348/155 |

(Continued)

FOREIGN PATENT DOCUMENTS

JP 2014506034 A 3/2014

OTHER PUBLICATIONS

PCT International Search Report for International Application No. PCT/US2015/068139, dated Apr. 18, 2016 (3 pp.).

*Primary Examiner* — Philip P. Dang
(74) *Attorney, Agent, or Firm* — Holland & Hart LLP

(57) ABSTRACT

Techniques are described for enhanced interactions for a security automation system using a doorbell camera. One method includes detecting, by the doorbell camera, that a person is located within a distance threshold to an entry of a structure based on received sensor data; identifying, by the doorbell camera, a suggested security action for the security and automation system to perform based on the detecting; transmitting the suggested action to the security and automation system based on the identifying; and broadcasting, via the doorbell camera, in response to the transmitting a message to the person located within the distance threshold.

14 Claims, 18 Drawing Sheets

(56) References Cited

U.S. PATENT DOCUMENTS

| | | | |
|---|---|---|---|
| 6,301,447 B1 | 10/2001 | Jackson et al. | |
| 6,583,813 B1 | 6/2003 | Enright et al. | |
| 7,015,943 B2 | 3/2006 | Chiang | |
| 7,187,279 B2* | 3/2007 | Chung | G08B 13/19645 340/506 |
| 7,263,182 B2* | 8/2007 | Allen | H04M 11/025 379/159 |
| 7,389,914 B1 | 6/2008 | Enright et al. | |
| 7,450,015 B2* | 11/2008 | Singer | G07C 9/00111 340/5.64 |
| 7,504,942 B2* | 3/2009 | Marman | G06K 9/00362 340/541 |
| 7,533,805 B1 | 5/2009 | Enright et al. | |
| 7,583,191 B2* | 9/2009 | Zinser | G08B 13/196 340/539.1 |
| 7,683,940 B2* | 3/2010 | Fleming | G11B 27/034 348/207.1 |
| 7,847,820 B2* | 12/2010 | Vallone | G06K 9/00288 348/143 |
| 7,945,032 B2* | 5/2011 | Elberbaum | H04N 7/186 348/14.04 |
| 8,054,340 B2* | 11/2011 | Miki | H04N 5/772 348/143 |
| 8,120,459 B2* | 2/2012 | Kwak | H04L 12/64 340/5.2 |
| 8,139,098 B2* | 3/2012 | Carter | H04N 7/142 348/14.06 |
| 8,204,273 B2* | 6/2012 | Chambers | G08B 13/19613 382/103 |
| 8,302,856 B1 | 11/2012 | Grimm et al. | |
| 8,350,694 B1* | 1/2013 | Trundle | G08B 25/08 340/539.11 |
| 8,358,342 B2* | 1/2013 | Park | G06K 9/00771 348/143 |
| 8,780,201 B1 | 7/2014 | Scalisi et al. | |
| 8,897,433 B2 | 11/2014 | Mota et al. | |
| 2002/0113862 A1* | 8/2002 | Center, Jr. | H04N 7/148 348/14.08 |
| 2003/0193563 A1 | 10/2003 | Suzuki | |
| 2004/0080615 A1* | 4/2004 | Klein | G08B 13/19658 348/143 |
| 2004/0085205 A1* | 5/2004 | Yeh | G08B 13/19634 340/540 |
| 2005/0179539 A1 | 8/2005 | Hill et al. | |
| 2006/0279628 A1 | 12/2006 | Fleming | |
| 2007/0115390 A1* | 5/2007 | Makara | H04N 7/186 348/552 |
| 2007/0153091 A1* | 7/2007 | Watlington | H04N 7/15 348/208.14 |
| 2007/0182818 A1* | 8/2007 | Buehler | G08B 13/19602 348/143 |
| 2008/0111684 A1 | 5/2008 | Zinser | |
| 2008/0198006 A1 | 8/2008 | Chou | |
| 2009/0010493 A1* | 1/2009 | Gornick | G06K 9/00771 382/103 |
| 2009/0251545 A1* | 10/2009 | Shekarri | G06Q 10/00 348/158 |
| 2011/0018998 A1 | 1/2011 | Guzik | |
| 2011/0029370 A1* | 2/2011 | Roeding | G06Q 30/00 705/14.38 |
| 2011/0143811 A1* | 6/2011 | Rodriguez | G06K 9/00986 455/556.1 |
| 2011/0164108 A1 | 7/2011 | Bates et al. | |
| 2011/0248818 A1* | 10/2011 | Hashim-Waris | G06Q 30/0235 340/5.52 |
| 2012/0019674 A1* | 1/2012 | Ohnishi | G08C 17/00 348/207.1 |
| 2012/0069131 A1 | 3/2012 | Abelow | |
| 2012/0086625 A1 | 4/2012 | Takeda et al. | |
| 2012/0218301 A1 | 8/2012 | Miller | |
| 2012/0314901 A1* | 12/2012 | Hanson | A61B 5/0077 382/103 |
| 2013/0046477 A1* | 2/2013 | Hyde | A61B 5/4833 702/19 |
| 2013/0057695 A1 | 3/2013 | Huisking | |
| 2013/0215276 A1 | 8/2013 | Cho | |
| 2014/0015967 A1 | 1/2014 | Moore et al. | |
| 2014/0240504 A1 | 8/2014 | Cho | |
| 2014/0267716 A1 | 9/2014 | Child et al. | |

* cited by examiner

ENHANCED DOORBELL CAMERA INTERACTIONS

CROSS REFERENCES

The present application is a continuation in part of U.S. patent application Ser. No. 14/596,047, entitled "Doorbell Camera Early Detection," filed Jan. 13, 2015. The disclosure of which is incorporated by reference herein in its entirety.

BACKGROUND

The present disclosure, for example, relates to security and/or automation systems, and more particularly to systems and methods for enhanced interactions via a doorbell camera.

Security and automation systems are widely deployed to provide various types of communication and functional features such as monitoring, communication, notification, and/or others. These systems may be capable of supporting communication with a person through a communication connection or a system management action.

Typically, doorbell cameras either take a picture or begin to record video when the doorbell is actuated. The picture or video may be sent the homeowner (e.g., via a control panel of the security and/or automation system) so the homeowner can decide whether or not to respond to the visitor (e.g., with an audio message or by opening the door). The picture often provides little useful information since the camera is usually obstructed by the visitor's hand at the time the picture is taken. The video often is delayed in being displayed on the control panel due to buffering, etc. The homeowner's inability to identify the visitor in a timely manner due to the unhelpful picture or the delay in watching the video may result in the visitor departing before the homeowner can respond.

SUMMARY

The present disclosure is directed to early detection of visitors at a building or property. The early detection may include capturing images or video of one or more persons at an entry to the building or property. The image and/or video may be delivered to a person (e.g., homeowner) along with a notice regarding arrival of the visitor at the entry. The image may be used as a placeholder for initial identification of the visitor. The person may choose to also view the video for further identification of the visitor and/or a visitor event at the entry. The video may be buffered prior to the person selecting the video for viewing. The person may communicate a response to the visitor. In some examples, the person may operate a door, lighting, or other security and/or automation feature in response to the received notice.

The image and/or video that is delivered to the person may be from a time that predates some visitor activities at the entry. For example, the image may include a picture of the visitor that was taken just before the visitor actuated a doorbell or while the visitor was approaching the entry.

A visitor's presence may be identified using a variety of detection methods, individually or in some combination. For example, any one of motion detection, facial recognition, light contrast analysis, voice recognition, and image analysis may be used to determine that an object at the entry to the building or property is a person. In some cases, the exact person may be identified.

A method of monitoring an entry to a structure for a security automation system using a doorbell camera is described. The method may include detecting, by the doorbell camera, that a person is located within a distance threshold to the entry of the structure based at least in part on received sensor data, identifying, by the doorbell camera, a suggested security action for the security and automation system to perform based at least in part on the detecting, transmitting the suggested action to the security and automation system based at least in part on the identifying, and broadcasting, via the doorbell camera, in response to the transmitting a message to the person located within the distance threshold.

An apparatus of monitoring an entry to a structure for a security automation system using is described. The apparatus may include a processor, memory in electronic communication with the processor, and instructions stored in the memory. The instructions may cause the processor to detect that a person is located within a distance threshold to the entry of the structure based at least in part on received sensor data, identify a suggested security action for the security and automation system to perform based at least in part on the detecting, transmit the suggested action to the security and automation system based at least in part on the identifying, and broadcasting, via the doorbell camera, in response to the transmitting a message to the person located within the distance threshold.

A non-transitory computer readable medium for monitoring an entry to a structure for a security automation system is described. The non-transitory computer readable medium may store a program that, when executed by a processor, causes the processor to detect that a person is located within a distance threshold to the entry of the structure based at least in part on received sensor data, identify a suggested security action for the security and automation system to perform based at least in part on the detecting, transmit the suggested action to the security and automation system based at least in part on the identifying, and broadcasting, via the doorbell camera, in response to the transmitting a message to the person located within the distance threshold.

Some examples of the method, apparatus, and/or non-transitory computer-readable medium may further include processes, features, means, and/or instructions for: receiving the sensor data from at least one sensor associated with the doorbell camera, comparing the sensor data to a set of predetermined profiles associated with the structure, determining an identity of the person based at least in part on the comparing, and transmitting a notification indicating the identity of the person.

In some examples of the method, apparatus, and/or non-transitory computer-readable medium described above, the sensor data comprises at least one of sensed motion at or near the entry to the structure; sensed sound at or near the entry to the structure; sensed activation of a doorbell at or near the entry to the structure; or a combination thereof. In some examples of the method, apparatus, and/or non-transitory computer-readable medium described above, the suggested security action comprises at least one of establishing a communication session between a remote device and a communication device associated with the doorbell camera at or near the entry of the structure; turning a light on or off at the structure; locking or unlocking a door at the structure; turning an alarm on or off at the structure; or a combination thereof.

Some examples of the method, apparatus, and/or non-transitory computer-readable medium may further include processes, features, means, and/or instructions for broadcasting, via a communication component of the doorbell camera, a message at or near the entry to the structure based at least in part on the detecting. Some examples of the method, apparatus, and/or non-transitory computer-readable medium may further include processes, features, means, and/or instructions for broadcasting the message at or near the entry to the structure after a predetermined duration based at least in part on the detecting.

Some examples of the method, apparatus, and/or non-transitory computer-readable medium may further include processes, features, means, and/or instructions for receiving a written message, converting the written message into an audio message, and broadcasting the audio message at or near the entry to the structure.

Some examples of the method, apparatus, and/or non-transitory computer-readable medium may further include processes, features, means, and/or instructions for identifying a presence of an object at or near the entry to the structure based at least in part on the received sensor data, and broadcasting the message at or near the entry to the structure based at least in part on the presence of the object.

Some examples of the method, apparatus, and/or non-transitory computer-readable medium may further include processes, features, means, and/or instructions for receiving occupancy data within the structure based at least in part on received sensor data from at least one sensor located within the structure, identifying at least one person within the structure based at least in part on the occupancy data, and broadcasting the message at or near the entry to the structure based at least in part on tracked actions of the at least one person within the structure. In some examples of the method, apparatus, and/or non-transitory computer-readable medium described above, the tracked actions of the at least one person within the structure comprises receiving an acknowledgment push notification from a device associated with the at least one person within the structure.

Some examples of the method, apparatus, and/or non-transitory computer-readable medium may further include processes, features, means, and/or instructions for broadcasting the message a number of times during a predetermined duration at or near the entry to the structure based at least in part on the tracked actions. Some examples of the method, apparatus, and/or non-transitory computer-readable medium may further include processes, features, means, and/or instructions for transmitting a request to the person at or near the entry to the structure to record a message based at least in part on the tracked actions of the at least one person within the structure. In some examples of the method, apparatus, and/or non-transitory computer-readable medium described above, the message comprises at least one of an audio message, a video message, or a combination thereof. In some examples of the method, apparatus, and/or non-transitory computer-readable medium described above, the transmitting the request to the person to record the message is based at least in part on a predetermined duration from detecting that the person is present.

Some examples of the method, apparatus, and/or non-transitory computer-readable medium may further include processes, features, means, and/or instructions for receiving information regarding a delivery of a package to the structure, detecting a delivery person arriving at or near the entry to the structure, and broadcasting instructions to the delivery person based at least in part on the detecting.

Some examples of the method, apparatus, and/or non-transitory computer-readable medium may further include processes, features, means, and/or instructions for identifying an email delivery confirmation, identifying a tracking number in the email delivery confirmation, and confirming a validity of the email delivery confirmation and the tracking number based at least in part on performing an analysis of the tracking number.

Some examples of the method, apparatus, and/or non-transitory computer-readable medium may further include processes, features, means, and/or instructions for identifying a retailer or a delivery organization associated with the tracking number, comparing the tracking number to a remote tracking number database associated with the retailer or the delivery organization, and identifying a match between the tracking number associated with the email delivery confirmation and at least one tracking number associated with the remote tracking number database.

Some examples of the method, apparatus, and/or non-transitory computer-readable medium may further include processes, features, means, and/or instructions for capturing an image, video, or a combination thereof of the delivery person, performing an analysis of the captured image, video, or the combination thereof, determining a retailer or a delivery organization associated with the delivery person based at least in part on the analysis, and determining an identity of the delivery person associated with the retailer or the delivery organization based at least in part on the analysis.

Some examples of the method, apparatus, and/or non-transitory computer-readable medium may further include processes, features, means, and/or instructions for identifying a presence of a package carried by the delivery person based at least in part on the analysis, and broadcasting instructions to the delivery person to deliver the package to a designated location at or near the entry to the structure. In some examples of the method, apparatus, and/or non-transitory computer-readable medium described above, the instructions are pre-recorded, custom text, or a combination thereof.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
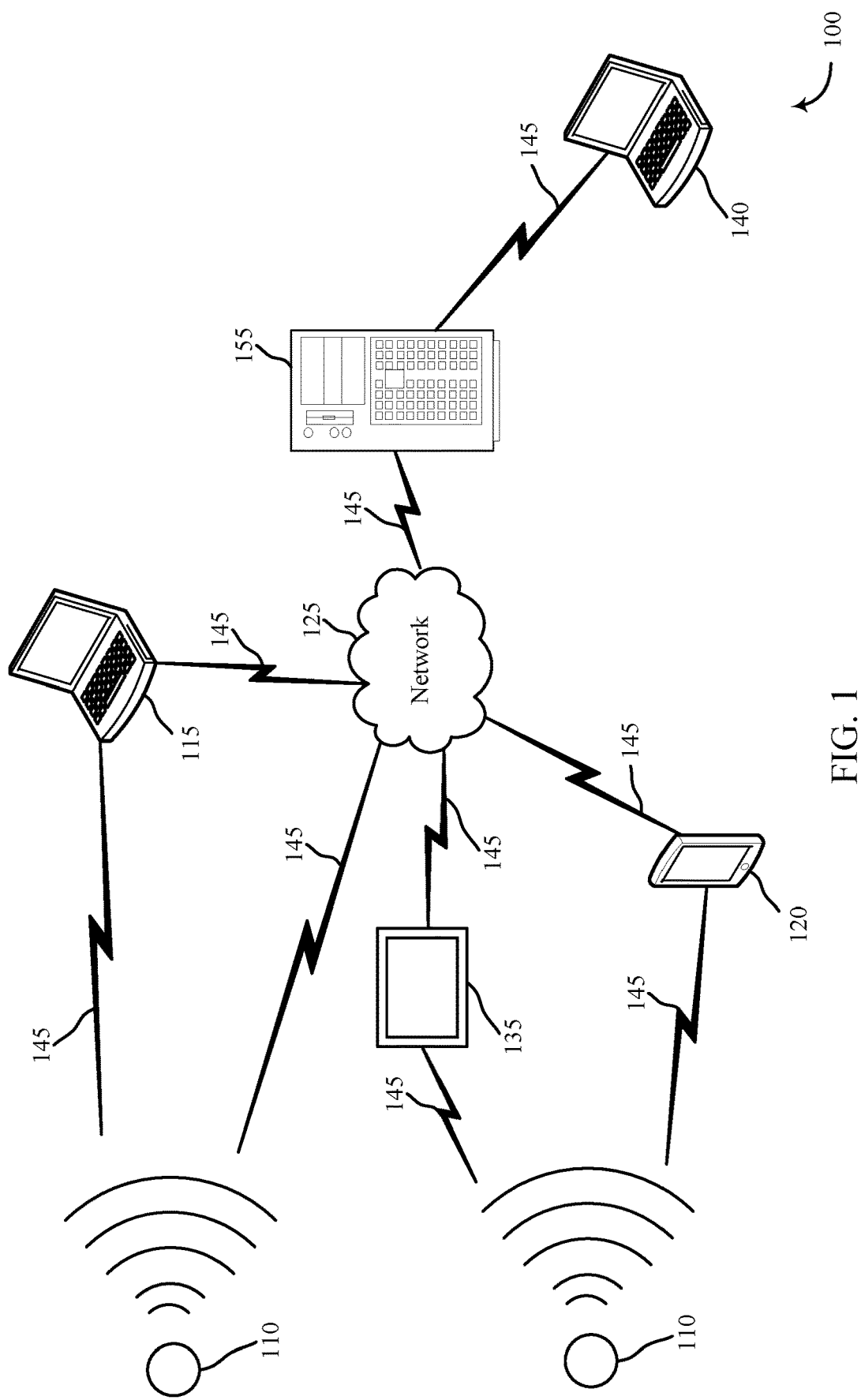
FIG. 1 shows a block diagram relating to an example security and automation system, in accordance with one or more examples of the present disclosure.

The present disclosure addresses the shortcoming of prior art doorbell camera systems by capturing still images and/or video in association with a doorbell operation event. The still images and/or video may be captured prior to the doorbell operation event. In one embodiment, the doorbell camera continuously captures video and overwrites the recorded video after a delay period if no doorbell operation occurs. In the event a visitor approached the doorway and operates the doorbell, the system may identify still images and/or videos from the time period before the doorbell operation and sends those images/video to the homeowner's computing device (e.g., app operating on the homeowner's smart phone or a control panel). In other embodiments, the capturing of images and video is initiated before the doorbell actuation based on other methods such as motion detection, facial recognition, algorithms for light and contrast, voice recognition, and spatial detection, alone or in combination with other considerations such as time of day, field of view, and the like.

Using images captured before the doorbell operation can address the problem of the camera being covered by the visitor's hand or other body part at the time the image is captured. The timing used for capturing the image may be optimized such that the visitor is close enough to the camera to be able to identify the visitor's face, but not so close that the image is distorted or filled by other body parts such as hands, arms, etc. The camera's field of view may also be optimized to capture the visitor's face as the visitor approached the doorway, waits at the doorway, and/or interacts with the doorbell. Facial recognition software may be used to assist in distinguishing between a person approaching the doorway and other types of movement that may be detected and/or recorded (e.g., movement of trees in the background or debris blown into the doorway). In some embodiments, the facial recognition may be used to identify specific visitors.

Using the video captured before the doorbell actuation may address the issue of delays in later view of the video by the homeowner due to buffering because the buffering (which is occurring continuously on the ongoing captured video stream) may already be completed or at least partially completed before the video is even sent to and/or opened for viewing by the homeowner.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 shows a block diagram relating to an example security and automation system 100, in accordance with one or more examples of the present disclosure. In some embodiments, the security and automation system 100 may include one or more sensor units 110, local computing device 115, 120, network 125, server 130, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required.

Local computing device 115, 120 and remote computing device 140 may be custom computing entities configured to interact with sensor units 110 via network 125, and in some embodiments, via server 130. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a person's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote person to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 130.

In some embodiments, the one or more sensor units 110 may be sensors configured to conduct periodic or ongoing automatic measurements related to detection of a visitor at an entry point to a building or property. Each sensor unit 110 may be capable of sensing multiple detection parameters, or alternatively, separate sensor units 110 may monitor separate detection parameters. For example, one sensor unit 110 may operate to detect motion, while another sensor unit 110 (or, in some embodiments, the same sensor unit 110) may detect facial features or other physical characteristics that distinguish the visitor from other objects at the entry. In some embodiments, one or more sensor units 110 may additionally monitor alternate detection parameters, such as light or color contrast, temperature of the detected object (e.g., via infrared sensing), a sensed electronic signal (e.g., a radio frequency identification (RFID) or near field communication (NFC) signal), or actuation of a communication device such as a doorbell, intercom, camera, keypad, or the like. In some embodiments, a person may input detection data directly at the local computing device 115, 120 or at remote computing device 140. For example, a person may enter data into a dedicated application on his smart phone indicating arrival at an entry to a building or property.

Data gathered by the one or more sensor units 110 may be communicated to local computing device 115, 120, which may be, in some embodiments, a thermostat or other wall-mounted input/output smart home display, such as an entry device for a building or property (e.g., a doorbell device or communications system interface). In other embodiments, local computing device 115, 120 may be a personal computer or smart phone. Where local computing device 115, 120 is a smart phone, the smart phone may have a dedicated application directed to collecting visitor detection data and/or responding to notices related to detected visitors. The local computing device 115, 120 may process the data received from the one or more sensor units 110 to obtain confirmation of the detected visitor. In alternate embodiments, remote computing device 140 may process the data received from the one or more sensor units 110, via network 125 and server 130, to obtain confirmation of the detected visitor. Data transmission may occur via, for example, frequencies appropriate for a personal area network (such as BLUETOOTH® or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of network 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a person may access the functions of local computing device 115, 120 from remote computing device 140. For example, in some embodiments, remote computing device 140 may include a mobile application that interfaces with one or more functions of local computing device 115, 120. In some embodiments, The server 130 may be configured to communicate with the sensor units 110, the local computing devices 115, 120, the remote computing device 140 and control panel 135. The server 130 may perform additional processing on signals received from the sensor units 110 or local computing devices 115, 120, or may simply forward the received information to the remote computing device 140 and control panel 135.

Server 130 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 130 may receive a stream of visitor detection related data from a sensor unit 110, a stream of detection data from the same or a different sensor unit 110, and a stream of detection data from either the same or yet another sensor unit 110. The data streams may include images, video and/or particular sensor data such as motion sensor data. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing detection data received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with resource usage data.

The security and automation system 100 may operate to detect that a visitor has arrived at an entry to a building or property, or determine that a visitor event has occurred via, for example, operation of sensors 110. The security and automation system 100 may transmit information to control panel 135 and/or directly to one of local computing devices 115, 120. In some embodiments, control panel 135 may notify the local computing devices 115, 120 or remote computing device 140 related to the detected visitor and/or visitor event. The notification or notice delivered to control panel 135 and/or local computing devices 115, 120, 140 may include an image of the visitor (e.g., a jpeg image). The image may be visible to one or more persons without opening the notification and/or unlocking the computing device. The person may be able to respond to the notification promptly (e.g., by sending a message to the visitor, such as an audio or visual message, or opening an access point to the building or property).

The security and automation system 100 may provide for delivery of a video clip associated with the visitor or visitor event to one or more of the control panel 135 and computing devices 115, 120, 140. The video clip may be accessible after the person views the image associated with the notification described above. The video may be buffered or otherwise prepared for viewing by the person at one or more of the control panel 135 and computing devices 115, 120, 140 concurrently with delivery of the notice and viewing of the image by the person. The video clip may provide additional details related to the visitor and/or the visitor event.

The buffering of the video prior to opening the notification may provide improved timing associated with being able to view the video clip. If the person can immediately view the video upon receipt of the notification, there may be reduced incidence of the visitor having to wait extended amounts of time prior to obtaining a response from the person, which may otherwise lead the visitor to leave before getting a response.

In some embodiments, the image that is sent with the notification may be collected before the visitor event (e.g., actuation of a doorbell). In at least some examples, security and automation system 100 may collect images before the visitor event (e.g., a continuously operating video camera) and the image is selected based on a predetermined step back in time once the visitor event has occurred. For example, the predetermined amount of time may be in the range of 0.5 seconds to about 2 seconds prior to the visitor event, which may capture an image of the visitor at a point in time leading up to the visitor event (e.g., actuating a doorbell, intercom button, door knock, or the like). The video clip may also cover a period of time prior to the visitor event. The video clip may begin to be buffered prior to the visitor event due to a continuously ongoing buffering process for ongoing captured video.

In other examples, the collection of images and/or video may be initiated based on detecting a visitor well in advance of the visitor performing an action such as actuating a doorbell (e.g., a visitor event). For example, the security and automation system 100 may identify a visitor approaching an entry to a building or property, which prompts initiation of video recording and/or taking pictures in an area of the entry.

Security and automation system 100 may use various methods to capture an image of the visitor's face or other recognizable body parts, or simply identify an object as a visitor. For example, security and automation system 100 may use facial recognition, light contrast, voice recognition, and the like, alone or in combination with motion detection, to confirm that an object in the area of the entry to the building or property is a person as opposed to other types of objects, such as animals, debris or objects moving in a background view (e.g., blowing trees). A camera or other sensor represented by sensor 110 in FIG. 1 may be set up and arranged in such a way to maximize the possibility of capturing the visitor's face or other recognizable body party as part of capturing images and/or video footage of the visitor and/or visitor event.

The processing associated with determining the presence of a visitor and/or a visitor event (e.g., data received from sensors 110) may be performed by any one of control panel 135 and computing devices 115, 120, 140. At least some of the data and other information associated with detecting a visitor and/or a visitor event, and the communications between a person of a building or property and a visitor, and the like may be stored on server 130 and/or any one of the control panel 135 and computing devices 115, 120, 140.

Figure 2:
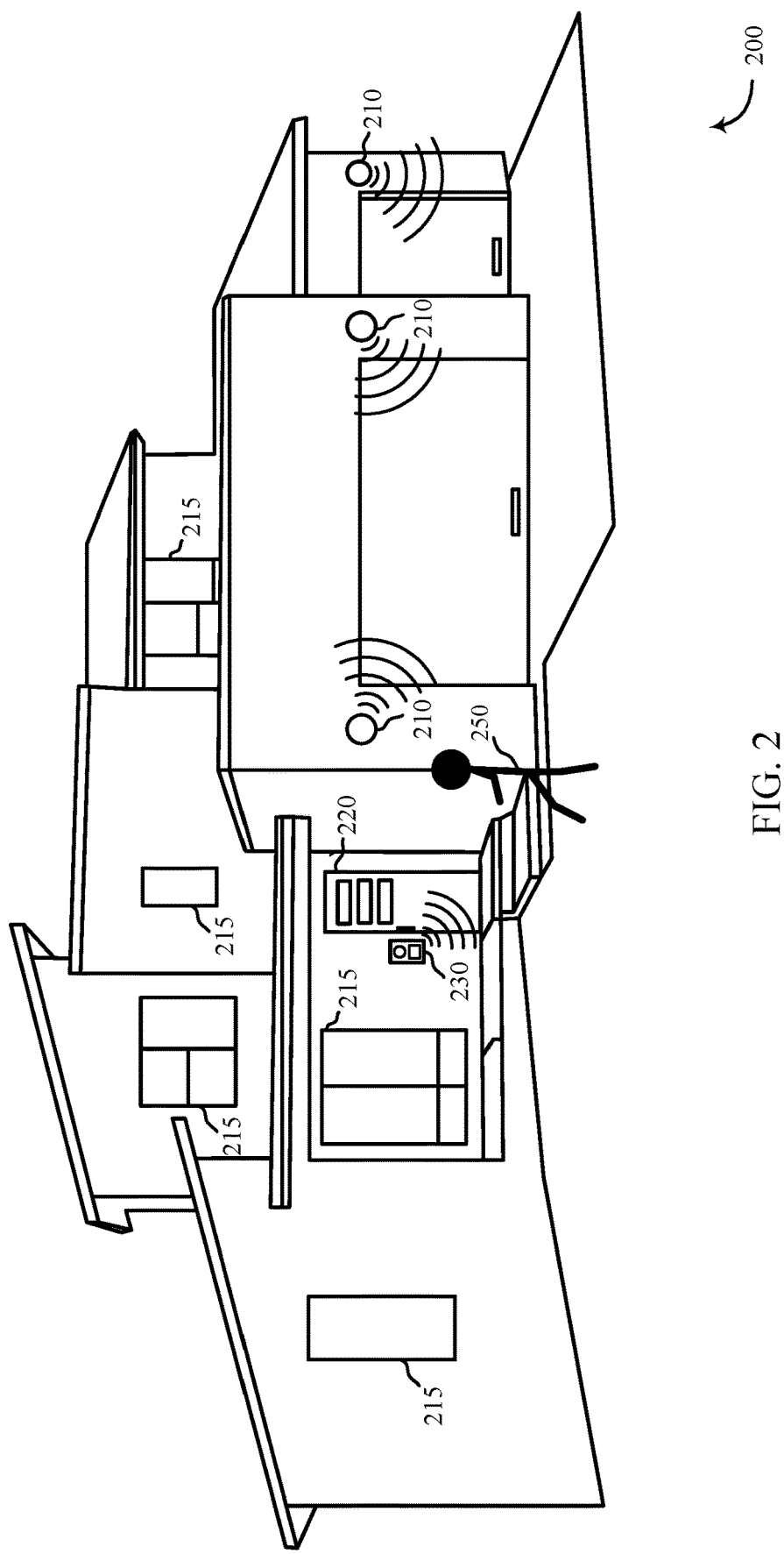
FIG. 2 shows an example diagram relating to an example security and automation environment, in accordance with one or more examples of the present disclosure.

FIG. 2 shows an example diagram relating to an example security and automation environment 200, in accordance with one or more examples of the present disclosure. The security and automation environment 200 may include one or more sensor units 210 and one or more access points 215 and 220. Security and automation environment 200 may, additionally or alternatively, support delivery of packages to the structure. Access points 215 may include windows of a home, and access point 220 may include an entrance door to the home. Additionally, access points of security and automation environment 200 may include one or more garage doors of the home. In some cases, the one or more sensor units 210 may be installed, mounted, or integrated with access points 215 and 220, or alternatively with an interior or exterior surface of the home in security and automation environment 200.

In some examples, security and automation environment 200 may include a doorbell camera component 230. The doorbell camera component 230 may be installed, mounted, or integrated near or at access point 220. In some examples, one or more sensor units 210 in conjunction with the doorbell camera component 230 may detect that a person 250 is located within a distance threshold to the entry access point 220 of the home based on received sensor data. The sensor data may include sensed motion at or near the entry to the structure, sensed sound at or near the entry to the structure, sensed activation of a doorbell at or near the entry to the structure, or a combination thereof. In some examples, doorbell camera component 230 may be integrated with one or more sensor units 210 and may solely detect person 250 within the distance threshold to the entry access point 220 of the home.

In some cases, person 250 may knock or ring a doorbell of entry access point 220. Doorbell camera component 230 may identify a suggested security action for the security and automation environment 200 to perform based on the detection. The suggested security action may include establishing a communication session between a remote device and a communication device associated with the doorbell camera component 230 at or near the entry of the structure. Additionally or alternatively, the suggested action may include transmitting instructions for turning a light on or off at the structure or locking or unlocking a an access point (e.g., entry access point 220) at the structure, or turning an alarm on or off at the structure; or a combination thereof.

Doorbell camera component 230 may transmit the suggested action to a security and automation system. Additionally, doorbell camera component 230 may broadcast a message to the person 250 located within the threshold distance. In some cases, doorbell camera component 230 may broadcast the message at or near the entry to the structure based on a setting. In some cases, the setting may include broadcasting the message after a predetermined duration. For example, doorbell camera component 230 may broadcast a message in response to detecting the person 250 within the threshold distance after 10 seconds. The predetermined duration may predetermined or preassigned by the security and automation system or a person associated with the structure. Alternatively, doorbell camera component 230 may broadcast a message immediately (i.e., minimum processing delay) in response to detecting the person 250. Additionally or alternatively, doorbell camera component 230 may broadcast the message a number of times during a predetermined duration at or near the entry access point 220.

Doorbell camera component 230 may broadcast the message to the person 250 located within the threshold distance based on tracked actions of a person within the structure. For example, doorbell camera component 230 may receive occupancy data within the structure based on received sensor data from one or more sensors located within the structure, in response to detecting person 250. In some examples, doorbell camera component 230 may identify at least one person within the structure based on the occupancy data and based on the tracked actions of the identified person. The tracked actions may include receiving an acknowledgment push notification from a device associated with the person within the structure. In some examples, doorbell camera component 230 may terminate broadcasting a message to person 250 at or near the entry access point 220 based on determining absent occupancy within the structure. In some examples, tracked actions may include receiving an non-acknowledgment push notification from a device associated with the person within the structure. Doorbell camera component 230 may as a result not play or stop repeating broadcasting of the message when there is a reason to believe that nobody is going to respond to person 250.

In some cases, doorbell camera component 230 may identify a timestamp (e.g., time and date) of detecting person 250. Doorbell camera component 230 may trigger broadcasting of sound within the structure when there is a reason to believe that nobody is going to respond to person 250, and determining that the identified timestamp is within a threshold range. For example, the threshold range may be during a timeframe (e.g., 8:00 am to 6:00 pm) when the structure is empty (i.e., a person might be remote at work). As such, security and automation system may play one or more sounds (e.g., dogs barking, people talking) via one or more automation components (e.g., speakers) located within the structure. The sounds may be prerecorded or preconfigured (e.g., uploaded from a source via a server). Alternatively, doorbell camera component 330 may trigger turning a light on or off at the structure, locking or unlocking a door at the structure, or turning an alarm on or off at the structure, etc. In some examples, doorbell camera component 230 may transmit a request to the person 250 at or near the entry access point 220. The request may be for person 250 to record a message. The message may be an audio message, or a video message, or both. In some cases, the request may be transmitted by doorbell camera component 230 to the person 250 to record the message after a predetermined duration from detecting person 250.

Additionally or alternatively, doorbell camera component 230 in conjunction with one or more sensor units 210 may recognize person 250 as an expected visitor and perform a set of actions, e.g., unlocking an access point, turning ON/OFF lights, turning ON/OFF an Heating Ventilation, and Air Conditioning (HVAC) system, etc.

Figure 3:
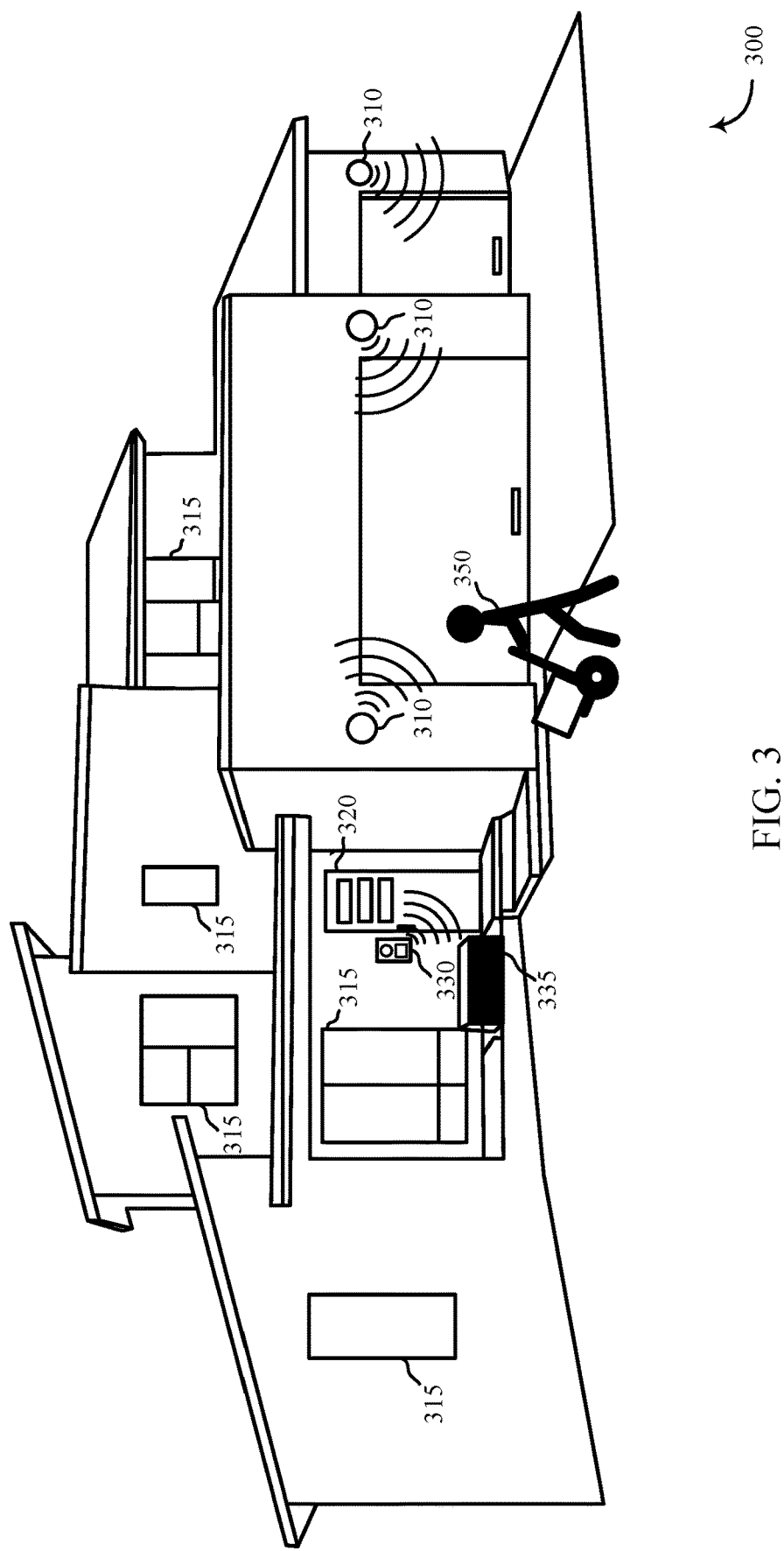
FIG. 3 shows an example diagram relating to an example security and automation environment, in accordance with one or more examples of the present disclosure.

FIG. 3 shows an example diagram relating to an example security and automation environment 300, in accordance with one or more examples of the present disclosure. The security and automation environment 300 may include one or more sensor units 310 and one or more access points 315 and 320. Security and automation environment 300 may, additionally or alternatively, support delivery of packages to the structure. Access points 315 may include windows of a home, and access point 320 may include an entrance door to the home. Additionally, access points of security and automation environment 300 may include one or more garage doors of the home. In some cases, the one or more sensor units 310 may be installed, mounted, or integrated with access points 315 and 320, or alternatively with an interior or exterior surface of the home in security and automation environment 300.

In some examples, security and automation environment 300 may include a doorbell camera component 330. The doorbell camera component 330 may be installed, mounted, or integrated near or at access point 320. Doorbell camera component 330 may receive information regarding a delivery of a package to the home of security and automation environment 300. The information received may include a delivery company name, delivery person information (e.g., delivery person name, photo ID, work ID, etc.), a unique code (e.g., barcode, quick-response (QR) code, etc.), a unique code associated with the delivery person, scheduled date of delivery, an expected time of delivery (e.g., a window of time), tracking number, number of packages, weight of each package, dimensions of each package, etc.

In some cases, doorbell camera component 330 may be granted access to a personal account associated with a delivery company. Thus, in some cases, doorbell camera component 330 in communication with control panel 134 may query delivery information by accessing the personal account, from which control panel 135 or doorbell camera component 330 may receive notifications of expected deliveries, real-time updates to the delivery information, real-time notices of a delivery person's arrival at the structure, or a combination thereof. In some cases, doorbell camera component 330 may generate a notification based on the received information regarding a delivery of a package to the home.

Doorbell camera component 330 may also provide instructions to a delivery person based on a preconfigured setting. For example, a person associated with the home may provide authorization to delivery personnel to drop off packages within a particular zone (e.g., package delivery zone 335). In some cases, doorbell camera component 330 in communication with one or more sensor units 310 may detect a delivery person 350 arriving. In some cases, doorbell camera component 330 in communication with one or more sensor units 310 may determine a location of a delivery vehicle.

The location of the delivery vehicle may be determined by a location device on the delivery vehicle such as a global positioning system (GPS). Additionally or alternatively, the delivery person 350 may provide information regarding his or her location (e.g., present delivery location, next delivery location). In some examples, based on geo-location, a state of a lock component associated with an access point may change when delivery person 350 is within a particular range.

In some examples, doorbell camera component 330 in conjunction with control panel 135 may receive information indicating that the delivery vehicle is at and/or within a predefined distance of the home. Doorbell camera component 330 may receive sensor data from one or more sensor units 310 located outside of the home that may be configured to recognize a delivery vehicle, a delivery uniform, a delivery company logo, etc. Thus, in some cases, upon receiving information indicating the delivery vehicle is at or near the structure, doorbell camera component 330 may scan captured images to detect a delivery vehicle and/or delivery person.

Delivery person 350 may receive instructions at a wireless device via the control panel 135 or doorbell camera component 330 to drop of a package in package delivery zone 335. In this example, package delivery zone 335 may be an area near the entrance—i.e., access point 320. In some cases, package delivery zone 335 may include a secured storage component with a digital or mechanical lock for delivery person 350 to drop off the package within the secured storage component. In some cases, delivery person 350 may be provided a security code for unlocking the secured storage component via doorbell camera component based at a time that the delivery person 350 is detected and identified by the doorbell camera component 330. One or more sensor units 310 may detect delivery person 350 near or at access point 320. The one or more sensor units 310 may capture sensor data such as, but not limited to, an image, record a video, capture audio data, monitor motion, etc., associated with delivery person 350. Doorbell camera component 330 may determine an identity of the delivery person 350.

In some examples, doorbell camera component 330 may identify a presence of a package carried by the delivery person 350 based on performing an analysis of captured image, video, or both associated with the delivery person 350. Doorbell camera component 330 may broadcast instructions to the delivery person 350 to deliver the package to a designated location (i.e., 335) at or near the entry to the home. The instructions may be pre-recorded, custom text, or both. Custom text may include pre-packaged text that is broadcasted (e.g., played) via doorbell camera component 330. Pre-packaged text may be associated with one or more individuals of the home pre-recording response messages. In some examples, the doorbell camera component 330 may broadcast a message notifying delivery person 350 that he or she is being recorded based on identifying the presence of the package carried by the delivery person 350.

In some cases, delivery person 350 may ring a doorbell and/or knock on the door (e.g., access point 320) of the home and/or trigger a motion detector. Upon detecting the delivery person 350 at the door, doorbell camera component 330 may capture a photo and/or video image of delivery person 350. The doorbell camera component may compare the captured image to an image of the delivery person 350 provided by a delivery company (e.g., a photo ID of the delivery person). In some cases, an automated system (e.g., a prerecorded message, a voice simulated message, etc.) of doorbell camera component 330 may request that the delivery person 350 stare into a camera in order to capture an image with a similar viewpoint as that of an image of the delivery person 350 provided by the delivery company.

Additionally, or alternatively, delivery person 350 may be instructed to place an identification card in relation to a camera of doorbell camera component 330. The identification card may include a photo ID of the delivery person 350, a name of the delivery person 350, a company name, a company logo, a unique code (e.g., barcode, QR code, etc.), short-range communication capabilities (e.g., radio frequency ID (RFID), near-field communication (NFC), etc.), and the like. Upon receiving data from and/or capturing an image of the identification card, the doorbell camera component 330 may use any combination of the captured information (e.g., photo ID, name, barcode, RFID, etc.) to verify the identity of the delivery person 350. In some cases, such as when the delivery person 350 arrives outside an expected period of time, additional verification may be requested.

In some examples, before granting the delivery person 350 access to a delivery area (i.e., package delivery zone 335), the doorbell camera component 330 may request the delivery company verify the location of the delivery person 350, via communication with the control panel 135. For example, control panel 135 may query a server of the delivery company to determine the current location of the delivery vehicle associated with the expected delivery. Additionally, or alternatively, before granting the delivery person 350 access to a delivery area (i.e., package delivery zone 335), the control panel 135 may request that a person associated with structure approve granting the delivery person 350 access to the delivery location (i.e., package delivery zone 335). For example, the person may receive a real-time notification regarding the arrival of the delivery person 350 to the structure.

The person may receive a live audio and/or photo and/or video image feed of the delivery in progress. In some cases, the person may be enabled to communicate with the delivery person 350 in real-time between the person's mobile device and communication component in communication with doorbell camera component 330, via a network. In some examples, doorbell camera component 330 may request that the delivery person 350 input information associated with the package such as a tracking number and/or an employee identification code. In some cases, the doorbell camera component 330 may determine that the information is sent and/or received by a computing machine owned by the delivery company. For example, the security and automation environment 300 may determine that the information entered by the delivery person 350 is verified and registered by a secure server owned by the delivery company. Upon verifying that the information is entered and verified by the delivery company, temporary access to the package delivery zone 335 may be granted.

In some cases, doorbell camera component 330 may scan a barcode on a package. In some examples, doorbell camera component 330 may capture an image of barcode on a package. Doorbell camera component 330 in communication with the control panel 135 may then evaluate the captured image of the barcode to determine whether the package is expected. If the doorbell camera component 330 in communication with the control panel 135 determine that the barcode is associated with an expected package and/or delivery period, doorbell camera component 330 may broadcast instructions to the delivery person 350. The instructions may include a message for example an audio message, a video message, or both instructing the delivery person 350.

In some examples, doorbell camera component 330 may manage a delivery of a package once the arrival of an expected delivery is verified (e.g., verifying delivery information, identity of delivery person). In some cases, doorbell camera component 330 may provide instructions to the delivery person 350 regarding where to place a package. The instructions may be provided to the delivery person 350 upon detecting the delivery person 350 arriving at the structure. For example, the delivery person 350 may knock on access point 320, for example, knock or ring a doorbell. Upon detecting the delivery person 350 at the door, a communication device (e.g., a speaker at the door that is part of doorbell camera component 330) may provide instructions to the delivery person 350.

The instructions may include pre-recorded messages, digital text-to-speech messages, etc. For example, doorbell camera component 330 may transmit a recorded message to delivery person 350. The recorded message may include instructions how and where to deliver the package. In some examples, doorbell camera component 330 may provide instructions to the delivery person 350 via a data communication. For example, the delivery person 350 may receive an email, a text message, etc. In some cases, the delivery person 350 may be notified that the process of placing the delivery at the designated delivery location will be recorded. In some cases, the instructions may be broadcasted to the delivery person 350 via doorbell camera component 330 a number of times during a predetermined duration. For example, the instructions may be repeated two times to the delivery person 350 within a one minute time interval.

In some cases, doorbell camera component 330 in communication with one or more sensor units 310 may determine if the delivery person 350 places the package inside the package delivery zone 335. Upon determining where the delivery person 350 places the package inside the package delivery zone 335, doorbell camera component 330 in communication with one or more sensor units 310 may determine a proximity or a difference between the designated delivery location and the actual location where the package is delivered satisfies a predetermined threshold. Upon determining the proximity and/or the difference between the designated delivery location and the actual location where the package is delivered satisfies a predetermined threshold, doorbell camera component 330 may prompt the delivery person 350 to adjust the location of the package placement. For example, doorbell camera component 330 may provide an audio feedback (e.g., play a recorded voice instruction, digitally communicate a text-to-speech instruction, etc.), visual feedback via one or more sensor units 310.

Figure 4:
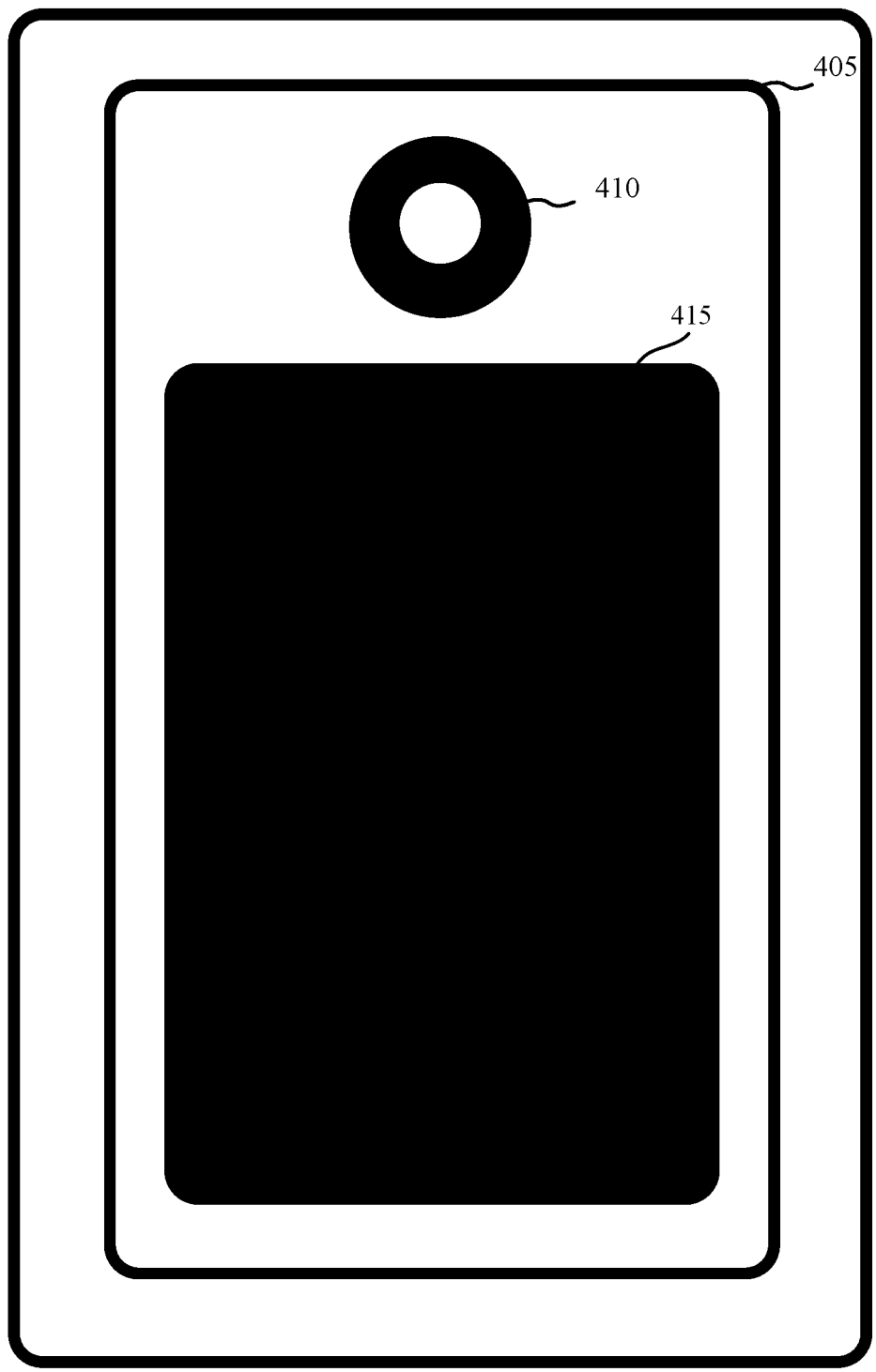
FIG. 4 shows an example diagram relating to an example doorbell camera component, in accordance with one or more examples of the present disclosure.

FIG. 4 shows an example diagram relating to an example doorbell camera component 400, in accordance with one or more examples of the present disclosure. The doorbell camera component 400 may include a security interface 405. In some examples, doorbell camera component 400 may be integrated with an access point. Doorbell camera component 400 may be one or more examples, of doorbell camera component as described with reference to FIGS. 2 and 3.

The security interface 405 may include a doorbell camera 410 and an communication interface 415. The doorbell camera component 400 may also be integrated with one or more sensors and/or a microphone. In some examples, the doorbell camera 410 may activate a feature of the communication interface 415, prior to physical interaction with the doorbell camera component 400. Doorbell camera 410 may be enabled to detect motion. In some examples, the doorbell camera 410 may detect motion occurring within a predetermined distance from doorbell camera component 400. The doorbell camera 410 may be additionally enabled to differentiate between environmental motion such as a passing vehicle, an animal, or wind and the movement of a person.

The doorbell camera 410 may identify a person within a range of doorbell camera component 400. For example, doorbell camera 410 may capture images or video of one or more persons at an entry to a structure. The doorbell camera 410 may then identify the person based on performing one or more image recognition techniques or video analytics, as discussed elsewhere herein. The communication interface 415, in some examples, may be part of bio-recognition. For example, any one of motion detection, facial recognition, light contrast analysis, voice recognition, and image analysis may be used to identify the person. In some examples, doorbell camera component 400 may include a tactile button that a person at the entry of the structure may press to leave a message via doorbell camera component 400.

Figure 5:
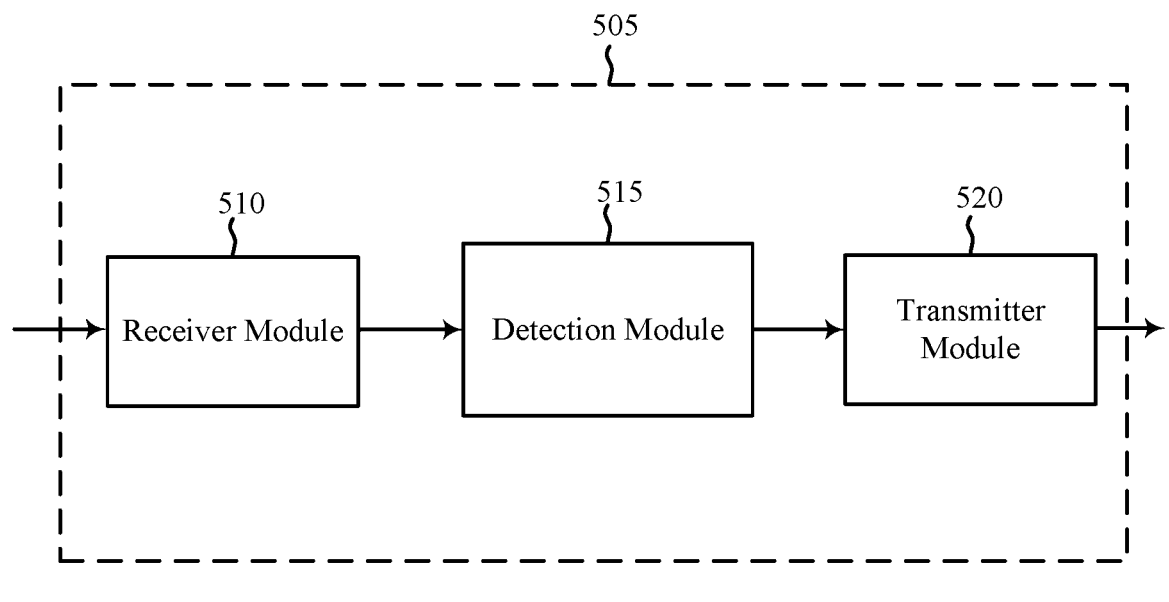
FIGS. 5-8B show example block diagrams of an example device relating to a security and automation system, in accordance with one or more examples of the present disclosure.

FIG. 5 shows an example block diagram of an example device 505 relating to a security and automation system 500, in accordance with one or more examples of the present disclosure. The device 505 may be an example of one or more aspects of the control panel 135 described with reference to FIG. 1. In other embodiments, the device 505 may be an example of one or more aspects of the local computing devices 115, 120 described with reference to FIG. 1, or a particular apparatus such as a doorbell apparatus or system located at an entry to a building or property. The device 505 may include a receiver module 510, a detection module 515, and/or a transmitter module 520. The device 505 may also be or include a processor. Each of these modules may be in communication with each other—directly and/or indirectly.

The components of the device 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 510 may receive information such as packets, person data, and/or control information associated with various information channels (e.g., control channels, data channels, etc.). The receiver module 510 may be configured to receive detection related data from, for example, sensors 110 shown in FIG. 1. The receiver module 510 may be configured to receive other information such as responsive communications from one or more persons who receive a notice related to the visitor or visitor event. Information may be passed on to the detection module 515, and to other components of the device 505.

The detection module 515 may operate to provide various functions related to, for example, detecting the presence of a visitor at a building or property, communication with a person of the building or property (e.g., a homeowner or property manager) related to detection of the visitor or a visitor event, facilitating communications between the person and the visitor, and/or providing access to a building or property based on the detected visitor, visitor event, or instructions provided by the person. The detection module 515 may conduct visitor detection using any of a variety of technologies, methods, equipment, and the like. In one example, detection module 515 receives data from a video motion detector and a facial recognition detector. In other embodiments, detection module 515 may receive data associated with a visitor event such as actuating a doorbell, intercom button, keypad, door knock, touch screen, or the like. In yet further examples, detection module 515 may receive data associated with a light contrast device or sensor, infrared sensor, or device that detects electronic signals such as a radio frequency identification (RFID) signal or geo-location signal.

Detection module 515 may generate a notice that is delivered to one or more persons of the building or property in response to a detected visitor or visitor event. The notice may include a picture of the visitor or other objects, along with other information. The notice may include a video clip or link to a video of the detected visitor or visitor event. The image associated with the notice may provide the person with the ability to understand who the visitor is before accepting the notice, opening the notice, or in some way accessing the video clip. The video clip may be buffered or otherwise be prepared for viewing while the notice is being generated and sent to the person. In other examples, the video clip is buffered after the notice is opened or the video clip is otherwise accessed. The picture itself may provide sufficient information for the person to act in response to the notice such as, for example, providing a responsive communication to the visitor, opening an access point (e.g., a door), turning on lighting, providing control of other electronic devices or generating further notices.

Detection module 515 may collect an image for delivery with the notice that is back in time before the visitor is detected and/or the visitor event occurs. In one example, device 505 may operate to generate a plurality of images such as by taking image frames from ongoing video captured of an entry to a building or property. Once the visitor is detected and/or a visitor event occurs (e.g., actuation of a doorbell), detection module 515 may go back in time and collect an image and/or video clip that ideally includes an image of the visitor's face or other recognizable feature. Using such back in time images and/or video may provide certain advantages including, for example, providing improved timing for capturing a image when the visitor is at a certain distance from the camera or within a viewing window of the camera. The timing may also provide for pre-buffering of the video prior to or during delivery of the notice to the person as compared to video footage that is collected after the visitor is detected and/or after the visitor event occurs when the timing is such that little buffering cannot be completed before the person requests viewing of the video.

In other embodiments, early image capture may be unnecessary if the visitor is identified at a time sufficiently far in advance of actuating the doorbell or reaching the entry point for the building or property. In one example, detection module 515 may detect a visitor when the visitor is 5 to 10 feet away from the entry point (e.g., front door). Detection module 515 may collect an image after a delay of detecting the visitor so that the visitor is within an ideal viewing window of the camera, or is sufficiently close to the camera to provide the desired image resolution. The collected image may be sent to the person prior to the visitor operating the doorbell or conducting other activities that may be considered a visitor event. Similarly, the video footage captured and sent to the person may also occur before the visitor event (e.g., operating a doorbell, intercom button, keypad, touch screen, or the like) so that the image and/or video selection is independent of the visitor event occurring.

Detection module 515 may detect that a person is located within a distance threshold to the entry of the structure based on received sensor data. In some examples, detection module 515 may identify a suggested security action for the security and automation system to perform. Detection module 515 may transmit the suggested action to the security and automation system based on the identifying, and broadcast in response to the transmission a message to the person located within the distance threshold.

Detection module 515 may receive the sensor data from at least one sensor associated with the doorbell camera, compare the sensor data to a set of predetermined profiles associated with the structure, determine an identity of the person based the comparing. In some cases, detection module 515 may transmit a notification indicating the identity of the person. The sensor data may include but is not limited to sensed motion at or near the entry to the structure, or sensed sound at or near the entry to the structure, or sensed activation of a doorbell at or near the entry to the structure, or any combination thereof. Additionally, the suggested security action may include establishing a communication session between a remote device and a communication device associated with a doorbell camera at or near the entry of the structure; turning a light on or off at the structure; locking or unlocking a door at the structure; turning an alarm on or off at the structure; or a combination thereof. In some cases, detection module 515 may broadcast, via a communication component of the doorbell camera, a message at or near the entry to the structure based on the detecting. The detection module 515 may broadcast the message at or near the entry to the structure after a predetermined duration.

In some examples, detection module 515 may receive a written message, convert the written message into an audio message, and broadcast the audio message at or near the entry to the structure. Detection module 515 may identify a presence of an object at or near the entry to the structure based on the received sensor data, and broadcast the message at or near the entry to the structure based on the presence of the object (e.g., package).

Detection module 515 may receive occupancy data within the structure based on received sensor data from at least one sensor located within the structure, identify at least one person within the structure based on the occupancy data, and broadcast the message at or near the entry to the structure based on tracked actions of the at least one person within the structure. In some examples of the tracked actions of the at least one person within the structure may include receiving an acknowledgment push notification from a device associated with the at least one person within the structure.

Detection module 515 may additionally or alternatively broadcast the message a number of times during a predetermined duration at or near the entry to the structure based on the tracked actions. In some case, detection module 515 may transmit a request to the person at or near the entry to the structure to record a message based on the tracked actions of the at least one person within the structure. The message may include at least one of an audio message, a video message, or a combination thereof. Detection module 515 may alternatively or additionally transmit the request to the person to record the message based on a predetermined duration from detecting that the person is present.

Detection module 515 receive information regarding a delivery of a package to the structure, detect a delivery person arriving at or near the entry to the structure, and broadcast instructions to the delivery person. In some cases, detection module may identify an email delivery confirmation, identify a tracking number in the email delivery confirmation, and confirm a validity of the email delivery confirmation and the tracking number based on performing an analysis of the tracking number. Additionally or alternatively, detection module 515 may identify a retailer or a delivery organization associated with the tracking number, compare the tracking number to a remote tracking number database associated with the retailer or the delivery organization, and identify a match between the tracking number associated with the email delivery confirmation and at least one tracking number associated with the remote tracking number database.

Detection module 515 may capture an image, video, or a combination thereof of the delivery person, perform an analysis of the captured image, video, or the combination thereof, determine a retailer or a delivery organization associated with the delivery person based on the analysis, and determine an identity of the delivery person associated with the retailer or the delivery organization based on the analysis. In some cases, detection module 515 may identify a presence of a package carried by the delivery person based on the analysis, and broadcast instructions to the delivery person to deliver the package to a designated location at or near the entry to the structure. In some examples, the instructions may be pre-recorded, custom text, or a combination thereof.

The transmitter module 520 may transmit the one or more signals received from other components of the device 505. The transmitter module 520 may transmit detection related information such as, for example, motion sensor data, facial recognition data, voice recognition data, images, or video. In some examples, the transmitter module 520 may be collocated with the receiver module 510 in a transceiver module.

Figure 6:
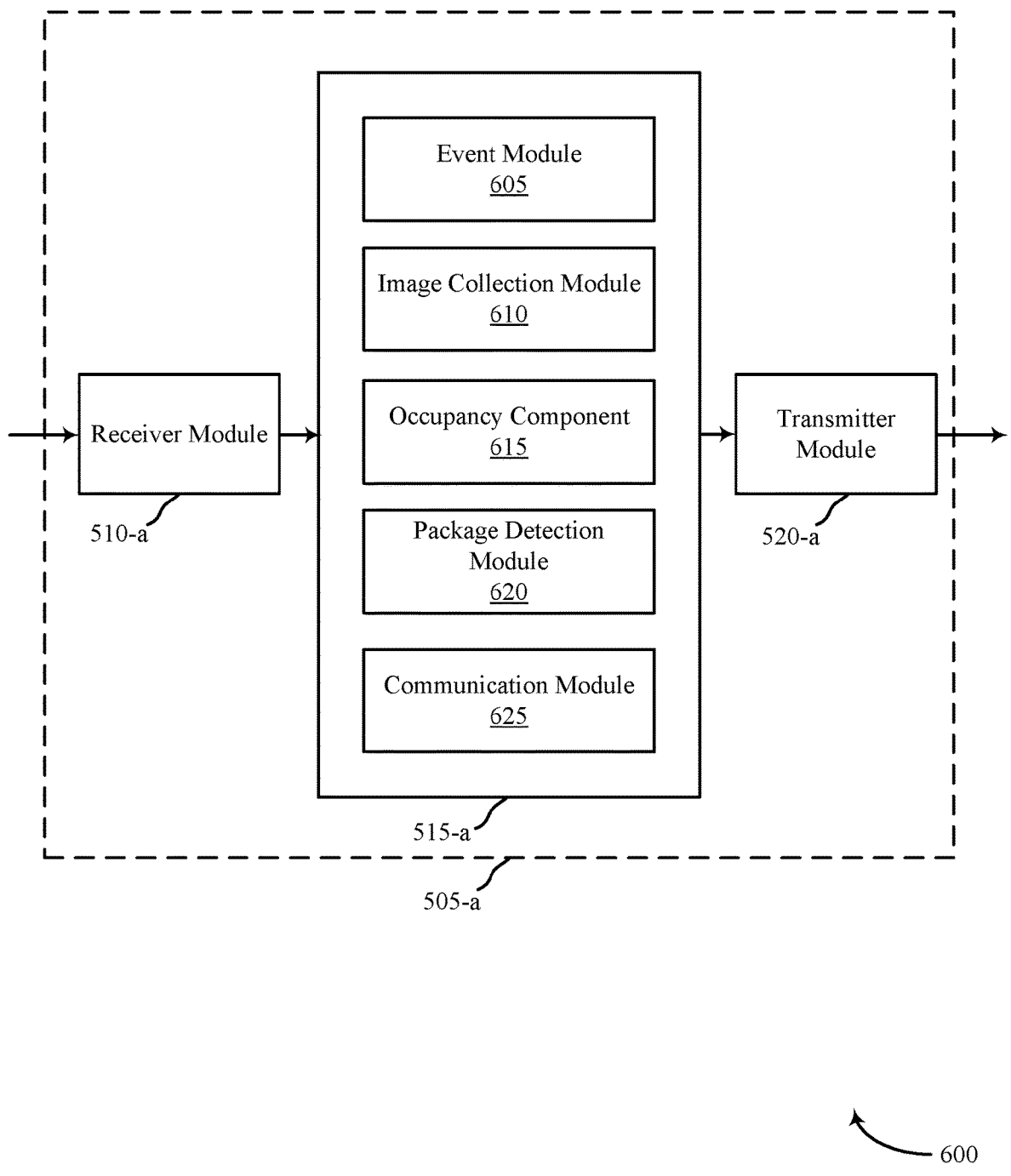

FIG. 6 shows an example block diagram of an example device 505-a relating to a security and automation system 600, in accordance with one or more examples of the present disclosure. The security and automation system 600 may be related to visitor detection, in accordance with various examples. The device 505-a may be an example of one or more aspects of a control panel 135 or local computing device 115, 120 described with reference to FIG. 1. It may also be an example of a device 505 described with reference to FIG. 5. The device 505-a may include a receiver module 510-a, a detection module 515-a, and/or a transmitter module 520-a, which may be examples of the corresponding modules of device 205. The device 505-a may also include a processor. Each of these components may be in communication with each other. The detection module 515-a may include an event module 605, an image collection module 610, an occupancy component 615, a package detection module 620, and a communication module 625. The receiver module 510-a and the transmitter module 520-a may perform the functions of the receiver module 510 and the transmitter module 520, of FIG. 5, respectively.

The components of the device 505-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in a memory formatted to be executed by one or more general and/or application-specific processors.

The event module 605 may operate to identify a visitor event. The visitor event may include, for example, operating a doorbell, keypad, intercom system, lighting, motion detection, touch screen, or the like. Event module 605 may determine that the visitor event has occurred based on data from one or more sensors, devices and/or systems. Event module 605 may, for example, generate notices, request further information, communicate with other modules of detection module 515-a, and perform other functions in response to received data.

Event module 605 may utilize data associated with, for example, facial recognition, light contrast, infrared sensing, object temperatures, motion detectors, sonic sensors, voice recognition, and the like as part of identifying a visitor. Once a visitor is identified, event module 605 may communicate with other modules, such as image collection module 610, as part of collecting information about the visitor such as an image or video clip. Event module 605 may generate notices and/or other data related to the identified event.

In some examples, event module 605 may detect that a person is located within a distance threshold to an entry of a structure (e.g., home) based on received sensor data. The sensor data may include at least one of sensed motion at or near the entry to the structure, sensed sound at or near the entry to the structure, sensed activation of a doorbell at or near the entry to the structure, or any combination thereof. Event module 605 may additionally identify a suggested security action for a security and automation system to perform based on detecting the person.

Event module 605 may in some example receive sensor data from at least one sensor associated with a doorbell camera. The event module 605 may compare the sensor data to a set of predetermined profiles associated with the structure. In some cases, event module 605 may alternatively identify a presence of an object (e.g., package) at or near the entry to the structure based on the received sensor data.

In some cases, event module 605 may receive information regarding a delivery of a package to the structure. Event module 605 may detect a delivery person arriving at or near the entry to the structure, and broadcast instructions to the delivery person. Additionally or alternatively, event module 605 may identify an email delivery confirmation and identify a tracking number in the email delivery confirmation. The event module 605 may confirm a validity of the email delivery confirmation and the tracking number based on performing an analysis of the tracking number. In some cases, event module 605 may identify a retailer or a delivery organization associated with the tracking number and compare the tracking number to a remote tracking number database associated with the retailer or the delivery organization. As a result, event module 605 may identify a match between the tracking number associated with the email delivery confirmation and at least one tracking number associated with the remote tracking number database.

Image collection module 610 may operate to collect one or more images related to a detected visitor, a visitor event, or area under observation by detection module 515-a. Image collection module 610 may include receiving a video stream from one or more cameras. The video content may be continuously buffered by image collection module 610. Image collection module 610 may store the collected images. The stored collected images may be automatically deleted after a predetermined time period, such as within a predetermined time unless a visitor event occurs, such as identifying presence of a visitor and/or operation of a doorbell.

Images and other data associated with one or more visitors as collected by image collection module 610 may be transmitted to another location for storage. The information may be associated with a notice such as a message that is delivered to one of control panel 135 and computing devices 115, 120, 140 shown in FIG. 1. The notice may include information regarding the visitor and/or a visitor event. The notice may include still shot images (e.g., jpeg images) or video footage. The notice may include text messages, audio messages, and the like.

Image collection module 610 may determine an identity of the person based on the comparison. In some examples, image collection module 610 may capture an image, video, or a combination thereof of the delivery person. The image collection module 610 may perform an analysis of the captured image, video, or the combination thereof. In some cases, image collection module 610 may determine a retailer or a delivery organization associated with the delivery person based on the analysis. Additionally, image collection module 610 may determine an identity of the delivery person associated with the retailer or the delivery organization based on the analysis. In some cases, image collection module 610 may identify a presence of a package carried by the delivery person based on the analysis.

Occupancy component 615 may receive occupancy data within the structure based on received sensor data from at least one sensor located within the structure. In some examples, occupancy component 615 may in conjunction with the image collection module 610 identify at least one person within the structure based on the occupancy data.

Communication module 625 may facilitate communications such as the notices described above with reference to event module 605 and image collection module 610. Communication module 625 may generate and/or transmit notices related to a detected visitor and/or visitor event. Communication module 625 may also operate to receive communications from other sources such as, for example, one or more of the control panel 135 and computing devices 115, 120, 140 shown in FIG. 1. The received communications may include instructions for operating some aspect of automation system 100 of FIG. 1 and/or device 505 of FIG. 5. Communication module 625 may receive information from another computing devices, such as, for example, an audio message, text message, images, or the like. The information may be displayed for the visitor or in some other way communicated to the visitor.

The received information may include instructions for operating a device of the building or property. For example, the communication may include instructions for unlocking a barrier such as a front door of the building. In other examples, the communication may include instructions for operating lighting, operating a camera, operating a display screen, entering a security code, or the like. Communication module 625 may be in communication with, for example, network 125 for facilitating communications between device 505-a and any one of control panel 135 and computing devices 115, 120, 140.

Communication module 625 may transmit a suggested action to a security and automation system based on identifying the suggested action in response to detecting a person within the distance threshold to the entry. In some cases, communication module 625 may broadcast a message to the person located within the distance threshold. The message may be based on the suggest action. For example, the suggested action may be to transmit a verbal or written message to the person within the distance threshold to the entry. Additionally or alternatively, the suggested security action comprises at least one of establishing a communication session between a remote device and a communication device associated with the doorbell camera at or near the entry of the structure; turning a light on or off at the structure; locking or unlocking a door at the structure; turning an alarm on or off at the structure; or a combination thereof.

In some examples, communication module 625 may broadcast a message at or near the entry to the structure based on detecting a person. Broadcasting the message may include playing a message via a doorbell camera unit (e.g., an intercom component associated with the doorbell camera). Alternatively, communication module 625 may broadcast the message at or near the entry to the structure after a predetermined duration based on detecting the person. The predetermined duration may be person-defined for example at control panel 135, or received from a device associated with the person (e.g., smartphone). Alternatively, the predetermined duration may be preassigned by the security and automation system. Communication module 625 may receive a written message and convert the written message into an audio message. In some examples, communication module 625 may broadcast the audio message at or near the entry to the structure. Additionally, communication module 625 may transmit a notification indicating the identity of the person identified by image collection module 610.

Communication module 625 may broadcast the message at or near the entry to the structure based on detecting the presence of the object. For example, the object may be a package for delivery to a person associated with the structure. As a result, communication module 625 may broadcast a message instructing for example a delivery person to place the package at a designated location. Communication module 625 may also broadcast the message at or near the entry to the structure based on tracked actions of the at least one person within the structure. The tracked actions for example may include receiving an acknowledgment push notification from a device associated with the identified person within the structure.

In some examples, communication module 625 may broadcast a message a number of times during a predetermined duration at or near the entry to the structure based on the tracked actions. In addition, communication module 625 may transmit a request to the person at or near the entry to the structure to record a message based on the tracked actions of the person within the structure. The message may include an audio message, a video message, or both. In some examples, communication module 625 may transmit the request to the person at or near the entry of the structure based on a predetermined duration (e.g., seconds, minutes) from detecting that the person is present. In some examples, communication module 625 may transmit the request to the person at or near the entry of the structure based on detecting a change in motion by the person. For example, a person may ring a doorbell and stand still while awaiting a response at a first time (e.g., initial time), after some time (e.g. a second time) the person may decide to leave based on not receiving a response. As a result, the security and automation system via the doorbell camera may broadcast a message notifying the person that someone is going to answer the door or provide an option to the person to leave a message.

Communication module 625 may in some cases broadcast instruction to the delivery person to deliver the package to a designated location at or near the entry to the structure. The instructions may be pre-recorded, custom text, or a combination thereof.

Figure 7:
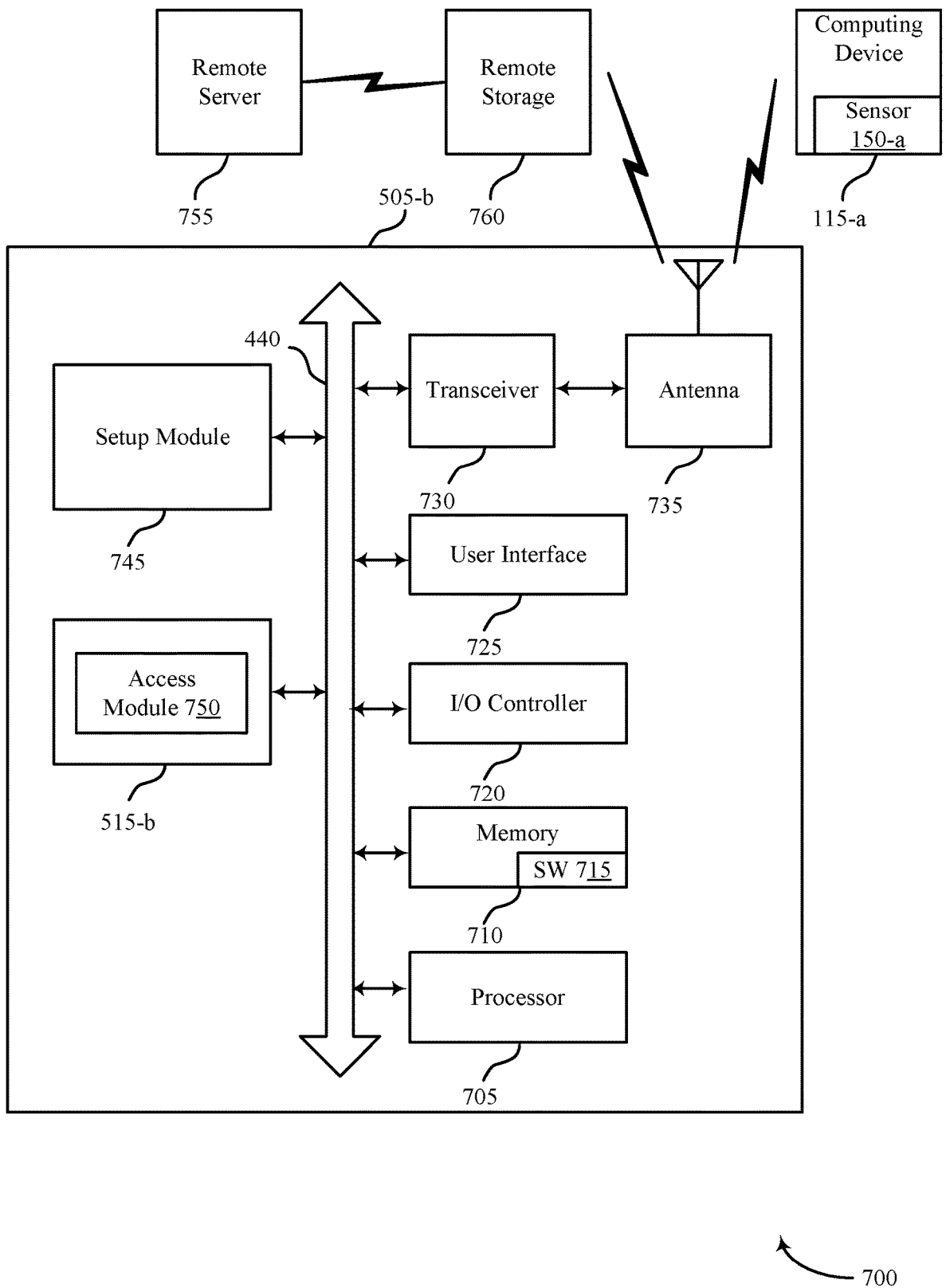

FIG. 7 shows an example block diagram of an example device 505-b relating to a security and automation system 700, in accordance with one or more examples of the present disclosure. The security and automation system 700 may be related to visitor detection, in accordance with various examples. Security and automation system 700 may include a device 505-b, which may be an example of the control panels 105 of FIG. 1. Device 505-b may also be an example of one or more aspects of device 505 and 505-a of FIGS. 5 and 6.

Device 505-b may include setup module 745, which may include at least some of the same feature or functions of the detection module 515 described with reference to FIGS. 5 and 6. Device 505-b may also include access module 750, which may be part of detection module 515-b. Detection module 515-b may be an example of detection module 515 described with reference to FIGS. 5 and 6.

Device 505-b may also include components for bi-directional voice and data communications including components for transmitting communications and components for receiving communications. For example, device 505-b may communicate bi-directionally with one or more of local computing device 115-a, one or more sensors 150-a, remote storage 760, and/or remote server 755 which may be an example of the remote server of FIG. 1. This bi-directional communication may be direct (e.g., device 505-b communicating directly with remote storage 760) or indirect (e.g., device 505-b communicating indirectly with remote server 755 through remote storage 760).

The setup module 745 may be particularly useful in setting up operation of device 505-b for detecting a visitor and/or visitor event. For example, setup module 745 may include one or more settings that are preset for standard sized entryways of a building or property. Setup module 745 may provide options for adjusting sensitivity of certain sensors, cameras, lighting, and the like to optimize detection of a visitor and/or visitor event. In one example, setup module 745 may provide adjustment of a field of view for one or more cameras used to detect a visitor. The field of view may be widened or narrowed, or adjusted up, down or side-to-side depending on, for example, certain background features such as vegetation, supporting structures of the building, and the like that may influence the ability to accurately capture an image of the visitor's face or other recognizable features. Setup module 745 may provide a digital zoom for adjusting the field of view. Setup module 745 may provide adjustment of other features such as, for example, a sensitivity of a motion detector, parameters of a light contrast sensor, parameters of an infrared sensor, and the like. The setup module 745 may be adjusted based on, for example, a distance that the device 505-b is positioned relative to an access point (e.g., door) of the building or property, ambient lighting, background colors, and the like.

Setup module 745 may include a learning feature that automatically optimizes, for example, a field of view, sensor setting, or the like over time as data is collected for various visitors and/or visitor events. For example, setup module 745 may automatically adjust to various lighting conditions, weather conditions, time of day considerations, physical size of visitors, number of visitors present at a given time, the type of visitor event, and the like to collect the desired information that may be useful for detecting a visitor or visitor event, and/or providing other functions in response to a detected visitor or visitor event.

In one example, setup module 745 may be preset with a certain camera field of view in a given XY coordinate based on where a visitor's face should be seen relative to when a doorbell operation occurs. Setup module 745 may provide optimization of the field of view with different XY coordinates and/or zoomed state, or timing based on the doorbell actuation, to obtain the most desirable image of the visitor's face for a majority of the visitor events that occur.

Setup module 745 may also operate to use one or more of a variety of different inputs for detecting a visitor and/or visitor event. In some scenarios, a person may select only a single parameter for determining presence of a visitor and/or a detection of a visitor event. In other arrangements, the person may request two or more such parameters. The parameters may include, for example, how a visitor approaches (e.g., directional or distance), algorithms for contrast and light as part of spatial detection, a time parameter such as time of day, field of view, motion detection, and the like.

The access module 750 may be part of the detection module 515-b. In some examples, setup module 745 may also be part of detection module 515-b. Access module 750 may operate independent of detection module 515-b and/or setup module 745. The access module 750 may facilitate access to a building or property in response to, for example, a detected visitor and/or visitor event. In one embodiment, a person may provide instructions for unlocking a door and/or opening a door in response to a notice about a visitor and/or visitor event. The person may provide instructions via, for example, one or more of control panel 135 and computing devices 115, 120, 140 shown in FIG. 1. The instructions may include operation of a door lock and/or opening of a door. Access module 750 may operate the door lock and/or door opening mechanism. Access module 750 may provide other operations, such as, for example, opening or closing windows, operating an elevator, or operating a security feature such as, for example, disarming a security system in order to permit the visitor to access the building or property without triggering an alarm.

The access module 750 may provide instructions to a person and/or visitor as part of providing the desired access. For example, access module 750 may provide an audible or text message to the visitor instructing the visitor to operate a door handle, enter a security code, or the like to facilitate access.

Device 505-b may also include a processor module 705, and memory 710 (including software/firmware code (SW) 715), an input/output controller module 720, a person interface module 725, a transceiver module 730, and one or more antennas 735 each of which may communicate—directly or indirectly—with one another (e.g., via one or more buses 740). The transceiver module 730 may communicate bi-directionally—via the one or more antennas 735, wired links, and/or wireless links—with one or more networks or remote devices as described above. For example, the transceiver module 730 may communicate bi-directionally with one or more of local computing device 115-a, remote storage 760, and/or remote server 755.

The transceiver module 730 may include a modem to modulate the packets and provide the modulated packets to the one or more antennas 735 for transmission, and to demodulate packets received from the one or more antenna 735. While a control panel or a control device (e.g., 505-b) may include a single antenna 735, the control panel or the control device may also have multiple antennas 735 capable of concurrently transmitting or receiving multiple wired and/or wireless transmissions. In some embodiments, one element of device 505-b (e.g., one or more antennas 735, transceiver module 730, etc.) may provide a direct connection to a remote server 755 via a direct network link to the Internet via a POP (point of presence). In some embodiments, one element of device 505-b (e.g., one or more antennas 735, transceiver module 730, etc.) may provide a connection using wireless techniques, including digital cellular telephone connection, Cellular Digital Packet Data (CDPD) connection, digital satellite data connection, and/or another connection.

The signals associated with security and automation system 700 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 735 and/or transceiver module 730 may include or be related to, but are not limited to, WWAN (GSM, CDMA, and WCDMA), wireless local area network (WLAN) including BLUETOOTH® and Wi-Fi, WMAN (WiMAX), antennas for mobile communications, antennas for Wireless Personal Area Network (WPAN) applications (including RFID and UWB). In some embodiments, each antenna 735 may receive signals or information specific and/or exclusive to itself. In other embodiments, each antenna 735 may receive signals or information not specific or exclusive to itself.

In some embodiments, one or more sensors 150-a (e.g., motion, proximity, smoke, light, glass break, door, window, carbon monoxide, and/or another sensor) may connect to some element of security and automation system 700 via a network using one or more wired and/or wireless connections. In some embodiments, the person interface module 725 may include an audio device, such as an external speaker system, an external display device such as a display screen, and/or an input device (e.g., remote control device interfaced with the person interface module 725 directly and/or through I/O controller module 720).

One or more buses 740 may allow data communication between one or more elements of device 505-b (e.g., processor module 705, memory 710, I/O controller module 720, person interface module 725, etc.). The memory 710 may include random access memory (RAM), read only memory (ROM), flash RAM, and/or other types. The memory 710 may store computer-readable, computer-executable software/firmware code 715 including instructions that, when executed, cause the processor module 705 to perform various functions described in this disclosure (e.g., detect one or more visitors, communicate notices related to the visitor, provide images and/or video related to the visitor, provide setup of a detection system, provide access to a building or other property based on a detected visitor, etc.). Alternatively, the software/firmware code 715 may not be directly executable by the processor module 705, but may cause a computer (e.g., when compiled and executed) to perform functions described herein. The processor module 705 may include an intelligent hardware device, e.g., a central processing unit (CPU), a microcontroller, an application-specific integrated circuit (ASIC), etc.

In some embodiments, the processor module 705 may include, among other things, an intelligent hardware device (e.g., a central processing unit (CPU), a microcontroller, and/or an ASIC, etc.). The memory 710 can contain, among other things, the Basic Input-Output system (BIOS) which may control basic hardware and/or software operation such as the interaction with peripheral components or devices. For example, the setup module 745, access module 750, and/or detection module 515-b to implement the present systems and methods may be stored within the system memory 710. Applications resident with security and automation system 700 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 730, one or more antennas 735, etc.).

Many other devices and/or subsystems may be connected to one or may be included as one or more elements of security and automation system 700 (e.g., entertainment system, computing device, remote cameras, wireless key fob, wall mounted person interface device, cell radio module, battery, alarm siren, door lock, lighting system, thermostat, home appliance monitor, utility equipment monitor, and so on). In some embodiments, all of the elements shown in FIG. 7 need not be present to practice the present systems and methods. The devices and subsystems can be interconnected in different ways from that shown in FIG. 7. In some embodiments, an aspect of some operation of a system, such as that shown in FIG. 7, may be readily known in the art and are not discussed in detail in this application. Code to implement the present disclosure can be stored in a non-transitory computer-readable medium such as one or more of system memory 710 or other memory. The operating system provided on I/O controller module 720 may be iOS®, ANDROID®, MS-DOS®, MS-WINDOWS®, OS/2®, UNIX®, LINUX®, or another known operating system.

The transceiver module 730 may include a modem configured to modulate the packets and provide the modulated packets to the antennas 735 for transmission and/or to demodulate packets received from the antennas 735. While the computing devices 115-a may include a single antenna 735, the computing devices 115-a may have multiple antennas 735 capable of concurrently transmitting and/or receiving multiple wireless transmissions. The device 505-b may include a detection module 515-b, which may perform the functions described above for the detection module 515 of device 505 of FIGS. 5 and 6.

Figure 8A:
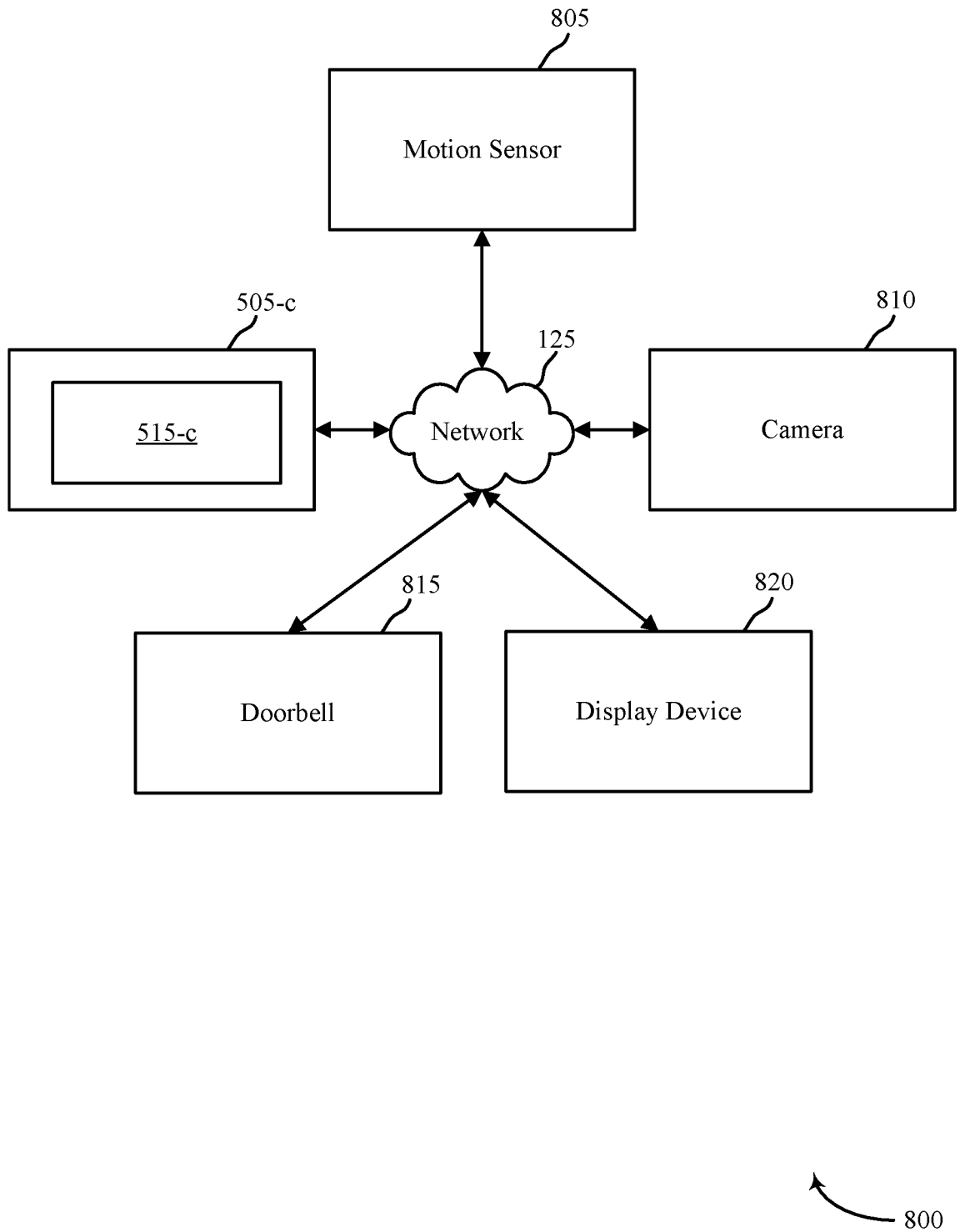

FIG. 8A shows an example block diagram relating to a security and automation system 800, in accordance with one or more examples of the present disclosure. In some examples, security and automation 800 may be related to visitor detection. Device 505-c may be an example of device 505 described above with reference to FIGS. 5-7. Detection module 515-c may be an example of the detection module 515 described with reference to FIGS. 5-7.

Security and automation system 800 may include a device 505-c that operates a detection module 515-c. Security and automation system 800 may also include at least one of a motion sensor 805, a camera 810, a doorbell 815, and a display device 820, which communicate with each other via network 125. Motion sensor 805 may be an example of the sensors 110 shown in FIG. 1. The camera 810 may be integrated into the doorbell 815, such as being housed in a common housing with doorbell 815 or other security and/or automation equipment located at an entry to a building or property. At least motion sensor 805, camera 810, and doorbell 815 may be positioned in proximity to an entry point to a building or property. In at least some examples, display device 820 may be positioned remote from the entry point, such as, for example, at an interior location of the building or property, or at a remote location relative to the building or property. Display device 820 may include, for example, a control panel of a security and/or automation system, or a mobile computing device carried by one or more persons (e.g., a smart phone, tablet computing device, laptop, or the like).

Detection module 515-c may receive information from one or more of motion sensor 805, camera 810, and doorbell

815 as part of detecting or determining presence of a visitor at the entry. The motion sensor 805 may detect motion associated with a visitor approaching and/or positioned at the entry of the building or property. Detection module 515-c may determine presence of a visitor based on the data from motion sensor 805 alone. In other examples, camera 810 may provide additional information such as, for example, facial recognition data, light contrast data, voice recognition data, or the like that is used by detection module 515-c, alone or in combination with the data received for motion sensor 805, to determine presence of one or more visitors. Detection module 515-c may send a notice to one or more persons via, for example, display device 820, informing the person about the detected visitor based on information received from one or more of motion sensor 805 and camera 810.

A visitor may operate doorbell 815, which may be recognized as a visitor event. Detection module 515-c may determine presence of the visitor based at least in part on operation of doorbell 815. Operation of doorbell 815 may be used in combination with data received from one or both of motion sensor 805 and camera 810 as part of determining presence of a visitor at the entry point.

Detection module 515-c may generate a notice of the detected visitor and/or visitor event. An image received from camera 810 may be associated with the notice. The image may include one or more visitors. The image may be from a time that is before operation of the doorbell 815 or at the time of or delayed from when the visitor is detected. The notice may include a video clip received from camera 810. The video clip may be accessible upon opening or otherwise accessing the notice via, for example, display device 820. As described above, the image associated with the notice may act as a placeholder that provides an immediate indication to the person of the detected visitor and/or visitor event in advance of accessing the video clip. The video clip may continue buffering prior to, during, and/or after the notice is sent to the person. The buffering may occur while the person views the image and contemplates how to respond to the image and/or whether or not to access the video clip.

The person may respond to the notice via display device 820. In some examples, the person may provide instructions in response to the notice, wherein the instructions are communicated via display device 820. The display device 820 may include, for example, a microphone, speaker, camera, touch screen, or the like that facilitates generating an instruction and/or responsive communication to the notice. Detection module 515-c may operate to present the instructions and/or communication from the person to the visitor. Detection module 515-c may provide additional operations in response to the instructions and/or response received from the person. For example, detection module 515-c may transmit an audio or text message to the visitor such as instructions for accessing the building and/or property, a request for further information, instructions for standing in a particular location for capturing of an improved image and/or video, or the like.

Figure 8B:
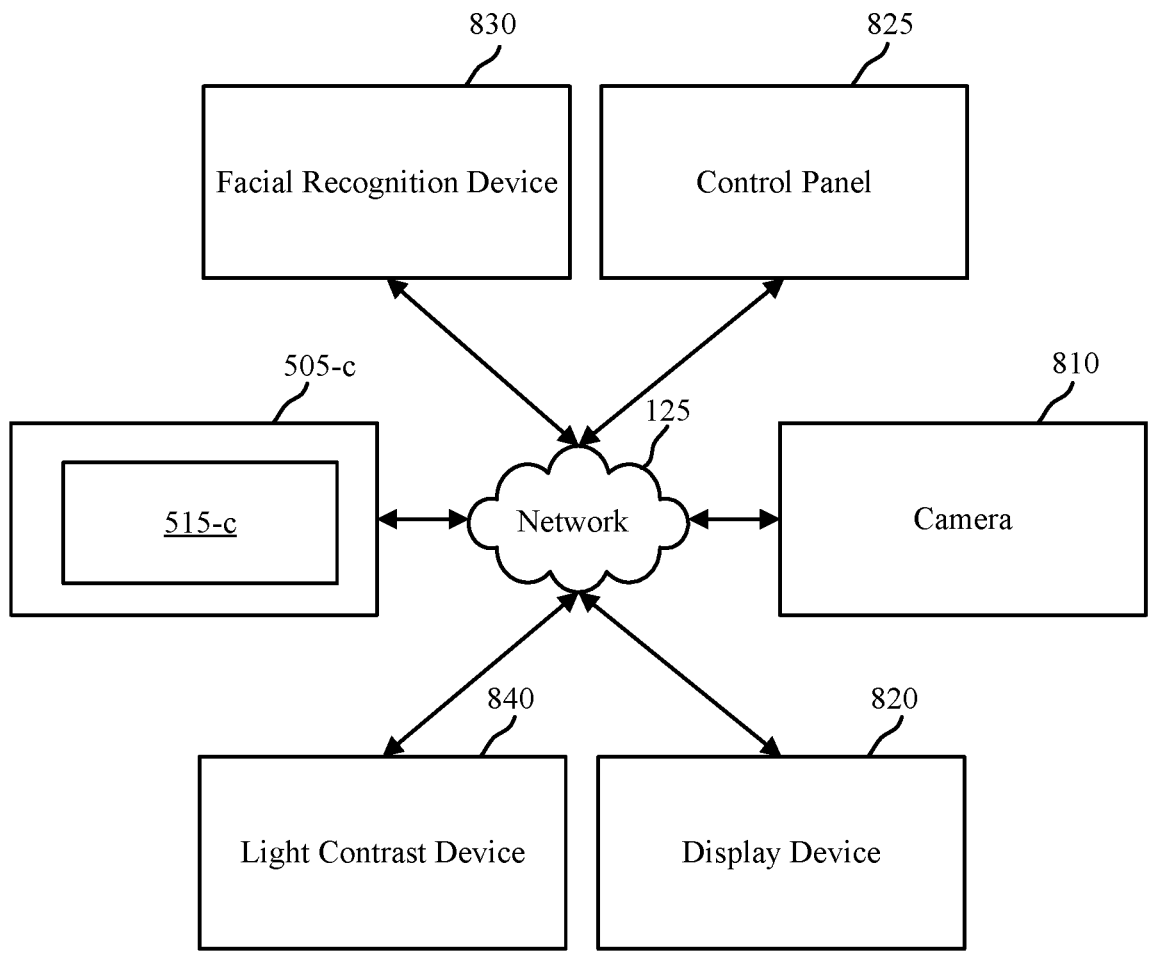

FIG. 8B shows an example block diagram relating to a security and automation system 800, in accordance with one or more examples of the present disclosure. Security and automation system 800 may in some cases relate to visitor detection. Additionally or alternatively, security and automation system 800 may operate in conjunction with or be part of a security system or automation system, or both. Security and automation system 800 may include a device 505-c, which may operate a detection module 515-c. Device 505-c may be an example of the device 505 described with reference to FIGS. 5-7. Detection module 515-c may be an example of detection module 515 described with reference to FIGS. 5-7.

Security and automation system 800 may include, in addition to camera 810 and display device 820, a facial recognition device 830, a control panel 825, and a light contrast device 840, which communicate with each other via network 125. The facial recognition device 830 and light contrast device 840 may be used alone or in combination to facilitate detection of one or more visitors. In some examples, security and automation system 800 may additionally include a motion sensor and doorbell such as the motion sensor 805 and doorbell 815 described with reference to FIG. 8A. Security and automation system 800 may include any combination of sensors, devices and systems in order to facilitate detection of a visitor.

Device 505-c may receive data from one or more of facial recognition device 830, light contrast device 840, and camera 810 as part of detecting a visitor and/or visitor event. Device 505-c may transmit the collected data to control panel 825. Control panel 825 may provide at least some of the processing needed for operation of detection module 515-c and/or the detection of a visitor and/or visitor event. In some examples, control panel 825 provides display of data and/or a notice transmitted by detection module 515-c. In at least some examples, control panel 825 transmits data and/or information to other computing devices such as display device 820.

Display device 820 may be a mobile computing device that is located on the premises of the building or property, or located remotely. As discussed above, display device 820 may be a handheld computing device such as a smart phone, a tablet computing device, laptop, or the like that a person can operate to receive notices related to a detected visitor and/or visitor event. A person may view the notice and/or respond to the notice and any associated images, video footage, instructions, and the like via one or both of control panel 825 and display device 820. In some examples, a person may provide communications or instructions to detection module 515-c via control panel 825 and/or display device 820. Detection module 515-c may facilitate communications to one or more visitors at an access point to a building or property.

Camera 810 may provide images and/or video that are used by facial recognition device 830 and/or light contrast device 840 as part of detecting one or more visitors. Facial recognition device 830 and/or light contrast device 840 may provide communications, instructions, or other controls for camera 810 to provide additional or improved data. In some examples, a feature such as setup module 745 described with reference to FIG. 7 may operate to control certain features of security and automation system 800 such as the facial recognition device 830, light contrast device 840, and/or camera 810 as part of optimizing detection of a visitor and/or visitor event.

Security and automation system 800 may include additional or fewer features in other embodiments. Detection module 515-c may operate based in part on input from any number of different data sources, may respond to or provide communications with one or more visitors, and provide certain functionality such as instructions for providing access to a building or property based on the components of security and automation system 800.

Figure 9:
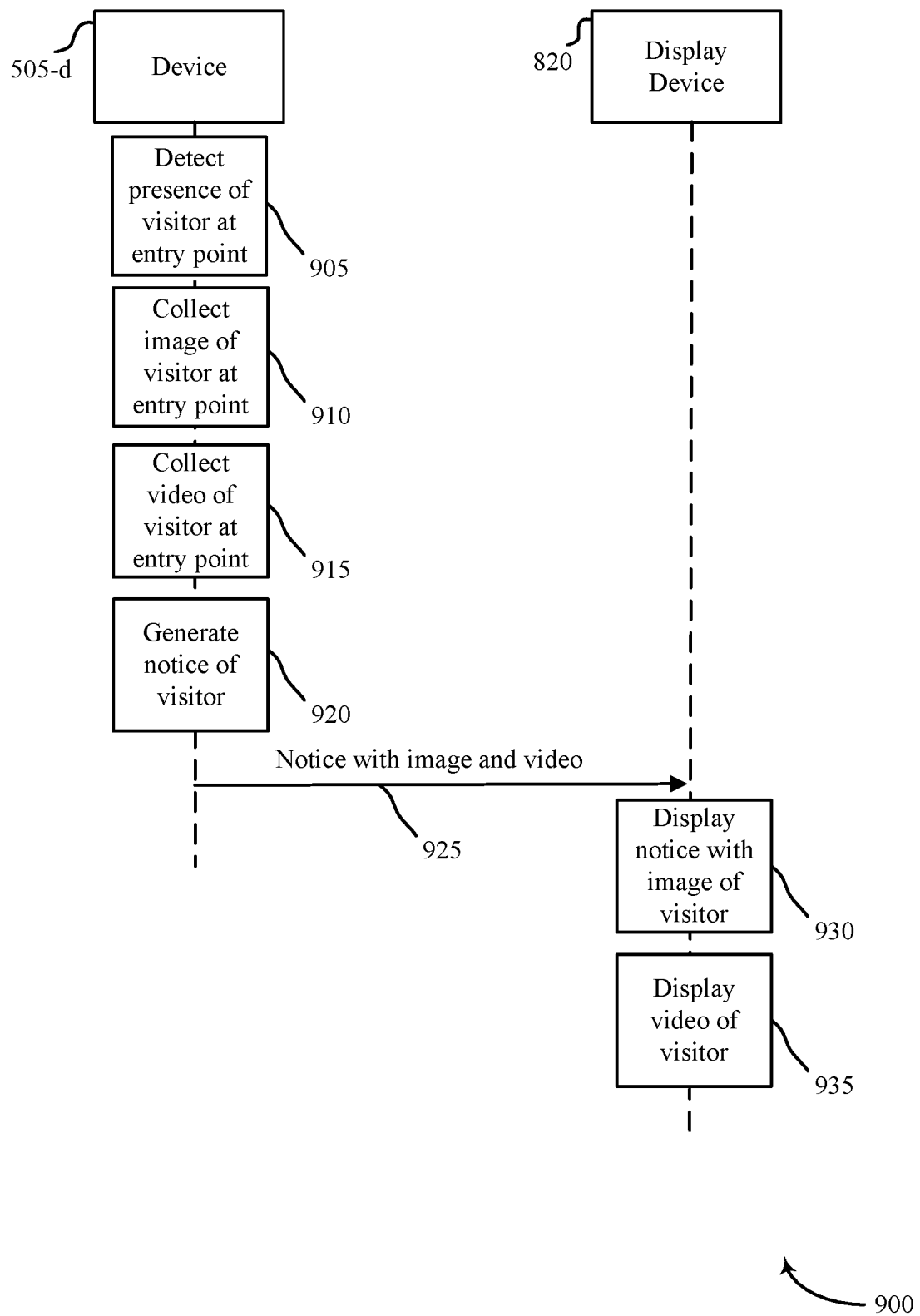
FIGS. 9-11 show an example of process flows relating to a security and automation system, in accordance with one or more examples of the present disclosure.

FIG. 9 shows an example of process flow 900 relating to a security and automation system, in accordance with one or more examples of the present disclosure. Process flow 900 may also support visitor detection. Process flow 900 may be used with or be part of a security system, or automation system, or both. Process flow 900 may include a device 505-d and a display device 820. Device 505-d may be an example of a device 505 described above with reference to FIGS. 5-11. Display device 820 may be an example to display device 820 of FIGS. 8A and 8B, or the computing devices 115, 120, 140 or control panel 135 of FIG. 1.

Device 505-d may detect presence of a visitor at an entry point of a building or property at block 905. At block 910, device 505-d may collect one or more images of the visitor at the entry point. Device 505-d may collect video footage of the visitor at the entry point at block 915. The collected images at block 910 may be taken from the video collected at block 915. Device 505-d may generate a notice of the visitor and/or a visitor event at block 920. Device 505-d may operate a detection module such as the detection module 515 described with reference to FIGS. 5-7 as part of providing the functions of block 905, 910, 915, 920. Device 505-d may transmit a notice 925 that contains an image and the video (e.g., a link to the video). The notice 925 may be delivered to display device 820.

Display device 820 may display a notice with the image of the visitor at block 930. Display device 820 may also display the video of the visitor at block 935. The image displayed at block 930 may be visible prior to opening or otherwise accessing the notice. In at least some examples, the image may be displayed at block 930 without unlocking the display device 820. The video may be displayed at block 935 after the image is displayed at block 930. The video may be buffered from when the video is collected at block 915 until the video is displayed at block 935.

In other embodiments, the presence of the visitor at block 905 may be detected and/or confirmed after one or both of the collection of the image and collection of video at blocks 910 and 915. In some examples, separate notices are sent with the image and/or video.

Figure 10:
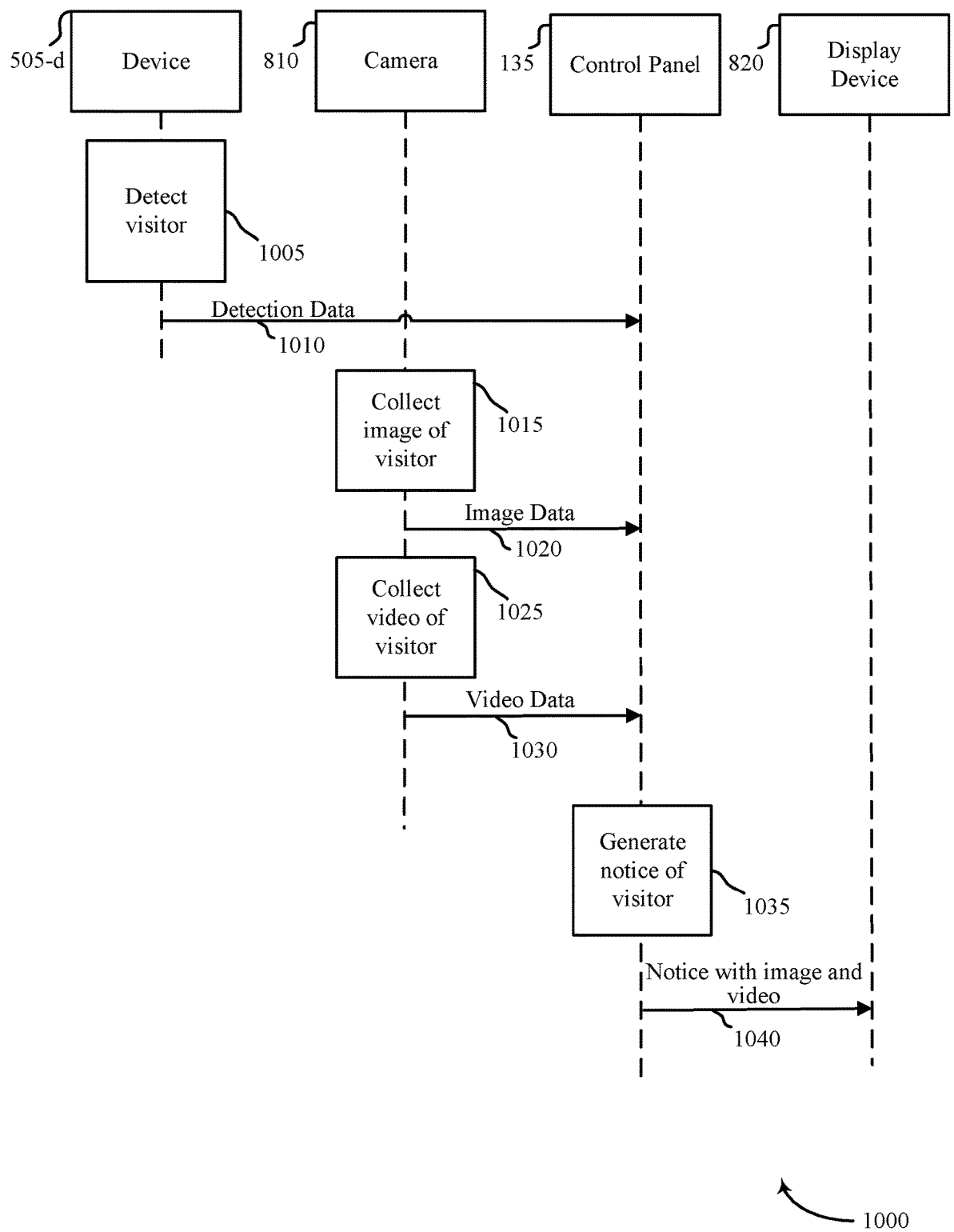

FIG. 10 shows an example of process flow 1000 relating to a security and automation system, in accordance with one or more examples of the present disclosure. Process flow 1000 may also support visitor detection. Process flow 1000 may be used with or be part of a security system, or automation system, or both. Process flow 1000 may include a device 505-e, camera 810, control panel 135, and display device 820. Device 505-e may be an example of device 505 described with reference to FIGS. 5-11. Camera 810 may be an example of a camera 810 described with reference to FIG. 8. Control panel 135 may be an example of control panel 135 described with reference to FIGS. 1, 8A and 8B. Display device 820 may be an example of a display device described with reference to FIGS. 8A and 8B. In some examples, display device 820 is integrated into control panel 135.

Process flow 1000 may operate to communicate information about a detected visitor to one or more persons such as homeowners or property managers for the building or property. Device 505-e may detect a visitor at block 1005. The device 505-e may transmit detection data 1010 to control panel 135. Camera 810 may collect one or more images of the detected visitor at block 1015. Camera 810 may transmit image data 1020 to control panel 135. Camera 810 may also collect video of the detected visitor at block 1025. The video data 1030 may be transmitted to control panel 135.

Control panel 135 may generate a notice of the visitor at block 1035. Control panel 135 may transmit the notice 1040 with the image and video to display device 820. One or more persons may access the notice, image, and/or video at display device 820.

In some embodiments, a person may provide responsive instructions and/or information after viewing the notice, image, and/or video. Generating the notice of the visitor at block 1035 may include attaching the image and/or video to the notice. In some embodiments, a separate notice with the image attached may be delivered to display device 820 separate from a notice with the video attached, which is sent to display device 820.

The collected image at block 1015 may be obtained from the collected video at block 1025. In at least some embodiments, the video may be collected at block 1025 prior to collecting the image at block 1015.

Detecting a visitor at block 1005 may include a number of types of information such as, for example, motion detection data, facial recognition data, light contrast data, or the like, alone or in combination. In other examples, detecting a visitor at block 1005 may occur in response to an action taken by a visitor such as, for example, operating a doorbell or other device at the entry to a building, which may be considered a visitor event.

Figure 11:
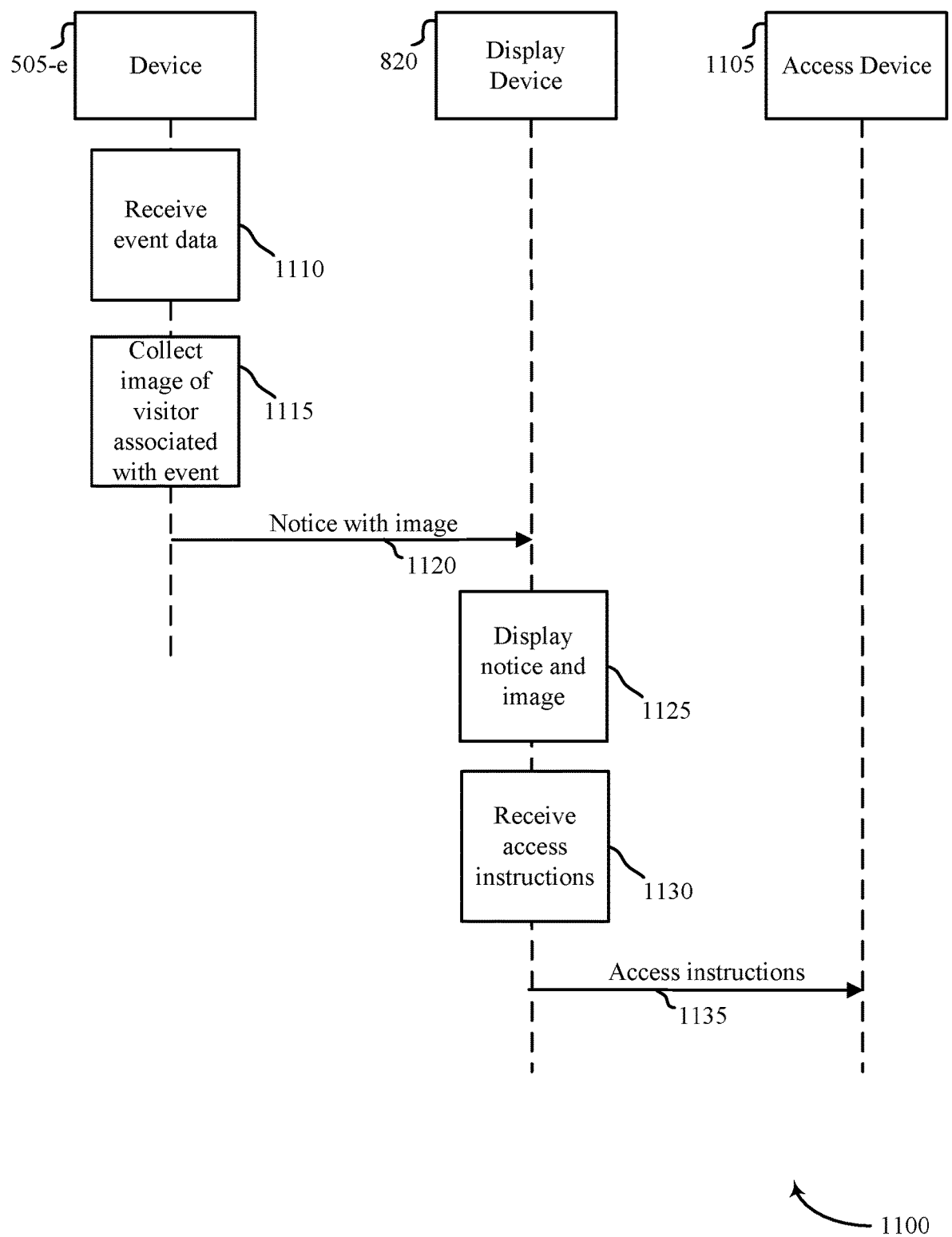

FIG. 11 shows an example of process flow 1100 relating to a security and automation system, in accordance with one or more examples of the present disclosure. Process flow 1100 may also support visitor detection. Process flow 1100 may operate with or by a security and/or automation system. Process flow 1100 may include a device 505-f, a display device 820, and an access device 1105. Device 505-f may be an example of the device 505 as described with reference to FIGS. 5-11. Display device 820 may be an example of the display device 820 described with reference to FIG. 8. Access device 1105 may cooperate with, for example, access module 750 described with reference to FIG. 7 as part of providing access to a building or property.

Device 505-f may operate to receive event data at block 1110. Device 505-f may also collect one or more images of a visitor associated with the event at block 1115. Device 505-f may transmit a notice 1120 with the image to the display device 820.

Display device 820 may display a notice and the image at block 1125. Display device 820 may also receive access instructions at block 1130. The access instructions may be received from one or more persons interfacing with display device 820. Display device 820 may transmit the access instructions 1135 to access device 1105. Access device 1105 may provide, for example, access to a building or property via a barrier such as a door.

The event data at block 1110 may include, for example, a visitor event such as operating a doorbell or other device, sensor, or the like at an entry to the building or property. The collected image at block 1115 may be obtained from a camera. The camera may collect video and/or still shot images. In some examples, the still shot images are obtained from a continuous video collected by the camera. In some examples, the collection of the image may be triggered by identification of the event and/or receipt of the event data at block 1110.

The notice 1120 may include the image as a placeholder. The image may be viewable without opening the notice or otherwise accessing the notice. The access instructions 1135 may include instructions for operating a door lock, a door handle, a door opening and/or closing device, a security code, or instructions for operating security feature associated with access device 1105.

Figure 12:
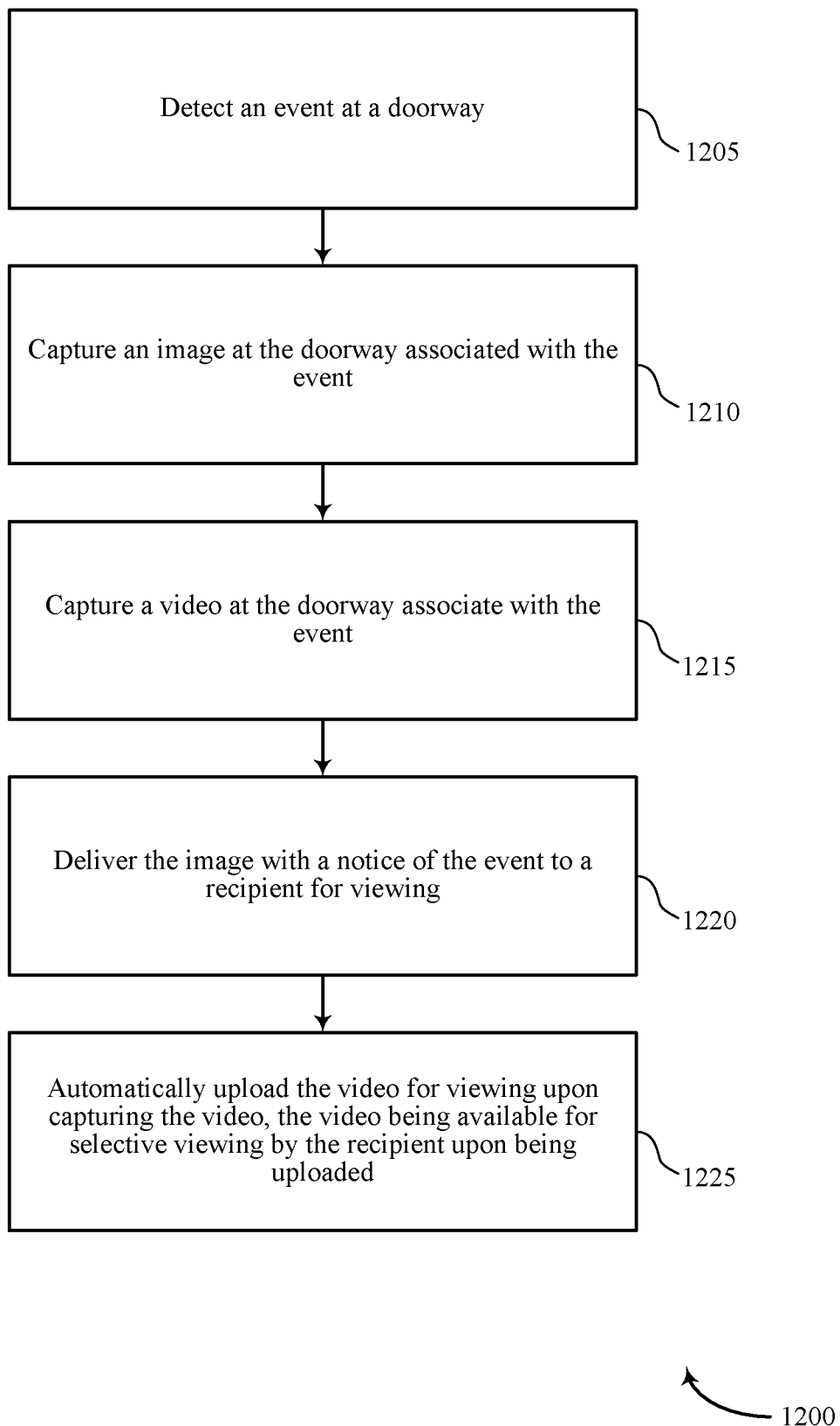
FIGS. 12-17 are flow charts illustrating an example of a method relating to a security and/or an automation system, in accordance with one or more examples of the present disclosure.

FIG. 12 shows a flow chart illustrating an example of a method 1200 relating to a security and/or an automation system, in accordance with one or more examples of the present disclosure. In some cases, method 1200 may be related to detection of visitors at a building or property, and particular relatively early detection of such visitors, in accordance with various aspects of the present disclosure. For clarity, the method 1200 is described below with reference to examples of one or more of the sensor units 110, local computing device 120, control panel 135, and/or remote computing device 140 as described with reference to at least FIG. 1. In addition, method 1200 is described below with reference to examples of one or more of the device 505 described with reference to at least FIGS. 5-11. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 1205, the method 1200 may include detecting an event at a doorway. The operation at block 1205 may be performed using control panel 135, sensor units 110, doorbell camera unit 405, or devices 505, described with reference to FIGS. 1, 4, and 5-11. In some examples, the operation at block 1205 may be performed, additionally or alternatively, using the event module as described with reference to FIG. 6.

At block 1210, the method 1200 may include capturing an image of the doorway associated with the event. The operation at block 1210 may be performed using control panel 135, sensor units 110, doorbell camera unit 405, or devices 505, described with reference to FIGS. 1, 4, and 5-11. In some examples, the operation at block 1210 may be performed, additionally or alternatively, using the image collection module as described with reference to FIG. 6.

At block 1215, the method 1200 may include capturing a video at the doorway associated with the event. The operation at block 1215 may be performed using control panel 135, sensor units 110, doorbell camera unit 405, or devices 505, described with reference to FIGS. 1, 4, and 5-11. In some examples, the operation at block 1215 may be performed, additionally or alternatively, using the image collection module as described with reference to FIG. 6.

At block 1220, the method 1200 may include delivering the image with a notice of events to a recipient for viewing. The operation at block 1220 may be performed using control panel 135, sensor units 110, doorbell camera unit 405, or devices 505, described with reference to FIGS. 1, 4, and 5-11. In some examples, the operation at block 1220 may be performed, additionally or alternatively, using the communication module as described with reference to FIG. 6.

At block 1225, the method 1200 may include automatically uploading the video for viewing upon capturing the video. The video may be available for selective viewing by the recipient upon being uploaded. In at least some examples, the video is delivered with the notice. The operation at block 1225 may be performed using control panel 135, sensor units 110, doorbell camera unit 405, or devices 505, described with reference to FIGS. 1, 4, and 5-11. In some examples, the operation at block 1225 may be performed, additionally or alternatively, using the communication module as described with reference to FIG. 6.

The method 1200 may provide for detection of visitors and related functions using automation/security systems. It should be noted that the method 1200 is just one implementation and that the operations of the method 1200 may be rearranged or otherwise modified such that other implementations are possible.

Figure 13:
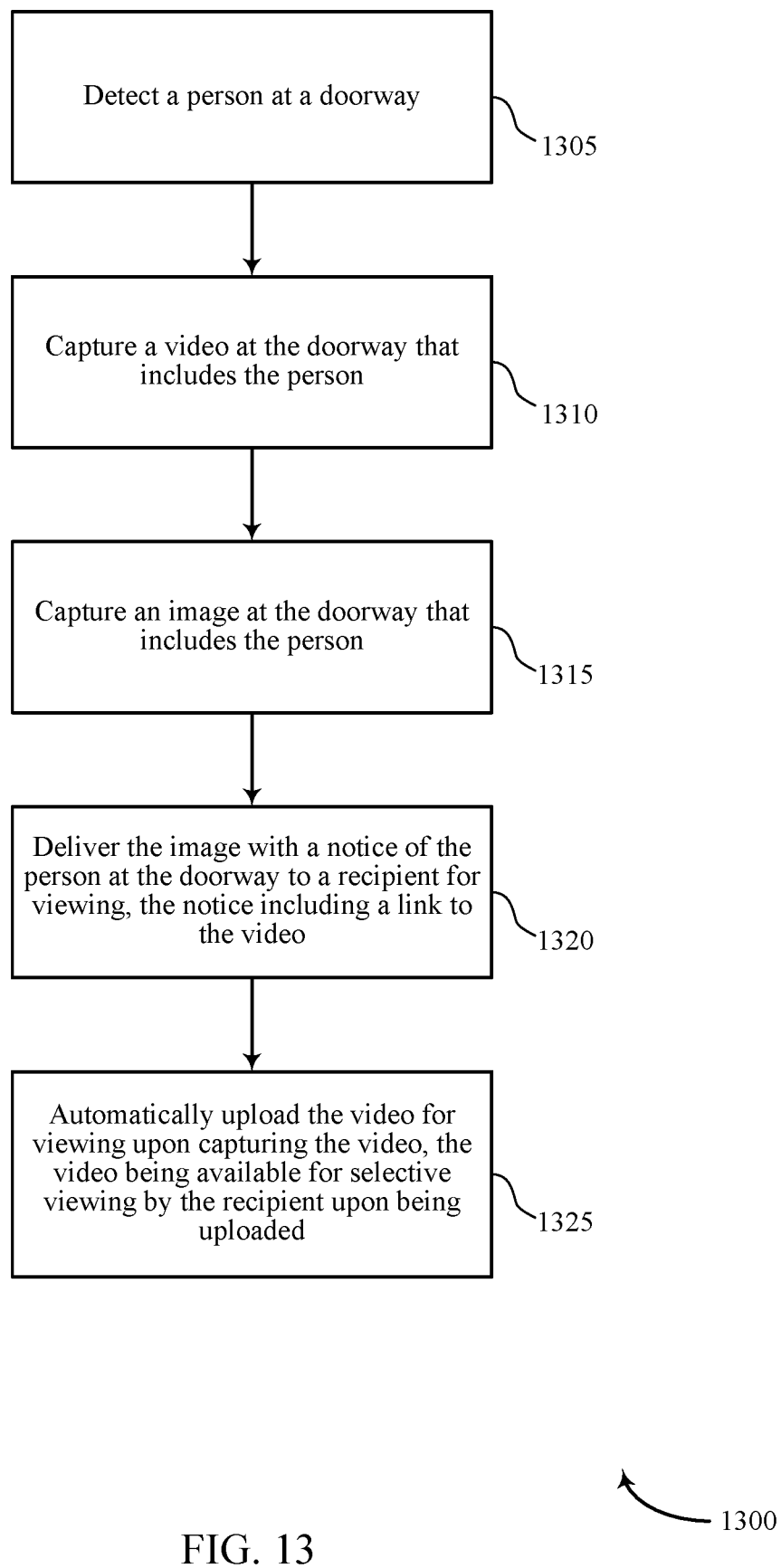

FIG. 13 shows a flow chart illustrating an example of a method 1300 relating to a security and/or an automation system, in accordance with one or more examples of the present disclosure. In some cases, method 1300 may be related to detection of visitors at a building or property, and particular relatively early detection of such visitors, in accordance with various aspects of the present disclosure. For clarity, the method 1300 is described below with reference to examples of one or more of the sensor units 110, local computing device 120, control panel 135, and/or remote computing device 140 as described with reference to at least FIG. 1. In addition, method 1300 is described below with reference to examples of one or more of the device 505 described with reference to at least FIGS. 5-11. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 1305, the method 1300 may include detecting a person at a doorway. The operation at block 1305 may be performed using control panel 135, sensor units 110, doorbell camera unit 405, or devices 505, described with reference to FIGS. 1, 4, and 5-11. In some examples, the operation at block 1305 may be performed, additionally or alternatively, using the event module as described with reference to FIG. 6.

At block 1310, the method 1300 may include capturing a video of the doorway and that includes the person. The operation at block 1310 may be performed using control panel 135, sensor units 110, doorbell camera unit 405, or devices 505, described with reference to FIGS. 1, 4, and 5-11. In some examples, the operation at block 1310 may be performed, additionally or alternatively, using the image collection module as described with reference to FIG. 6.

At block 1315, the method 1300 may include capturing an image of the doorway that includes the person. The operation at block 1315 may be performed using control panel 135, sensor units 110, doorbell camera unit 405, or devices 505, described with reference to FIGS. 1, 4, and 5-11. In some examples, the operation at block 1315 may be performed, additionally or alternatively, using the image collection module as described with reference to FIG. 6.

At block 1320, the method 1300 may include delivering the image with a notice of the person at the doorway to a recipient for viewing, where the notice includes a video and/or a link to the video. The operation at block 1320 may be performed using control panel 135, sensor units 110, doorbell camera unit 405, or devices 505, described with reference to FIGS. 1, 4, and 5-11. In some examples, the operation at block 1320 may be performed, additionally or alternatively, using the communication module as described with reference to FIG. 6.

At block 1325, the method 1300 may include automatically uploading the video for viewing upon capturing the video, where the video is available for selective viewing by the recipient upon being uploaded. The operation at block 1325 may be performed using control panel 135, sensor units 110, doorbell camera unit 405, or devices 505, described with reference to FIGS. 1, 4, and 5-11. In some examples, the operation at block 1325 may be performed, additionally or alternatively, using the communication module as described with reference to FIG. 6.

The method 1300 may provide for detection of visitors and related functions using automation/security systems. It should be noted that the method 1300 is just one implementation and that the operations of the method 1300 may be rearranged or otherwise modified such that other implementations are possible.

Figure 14:
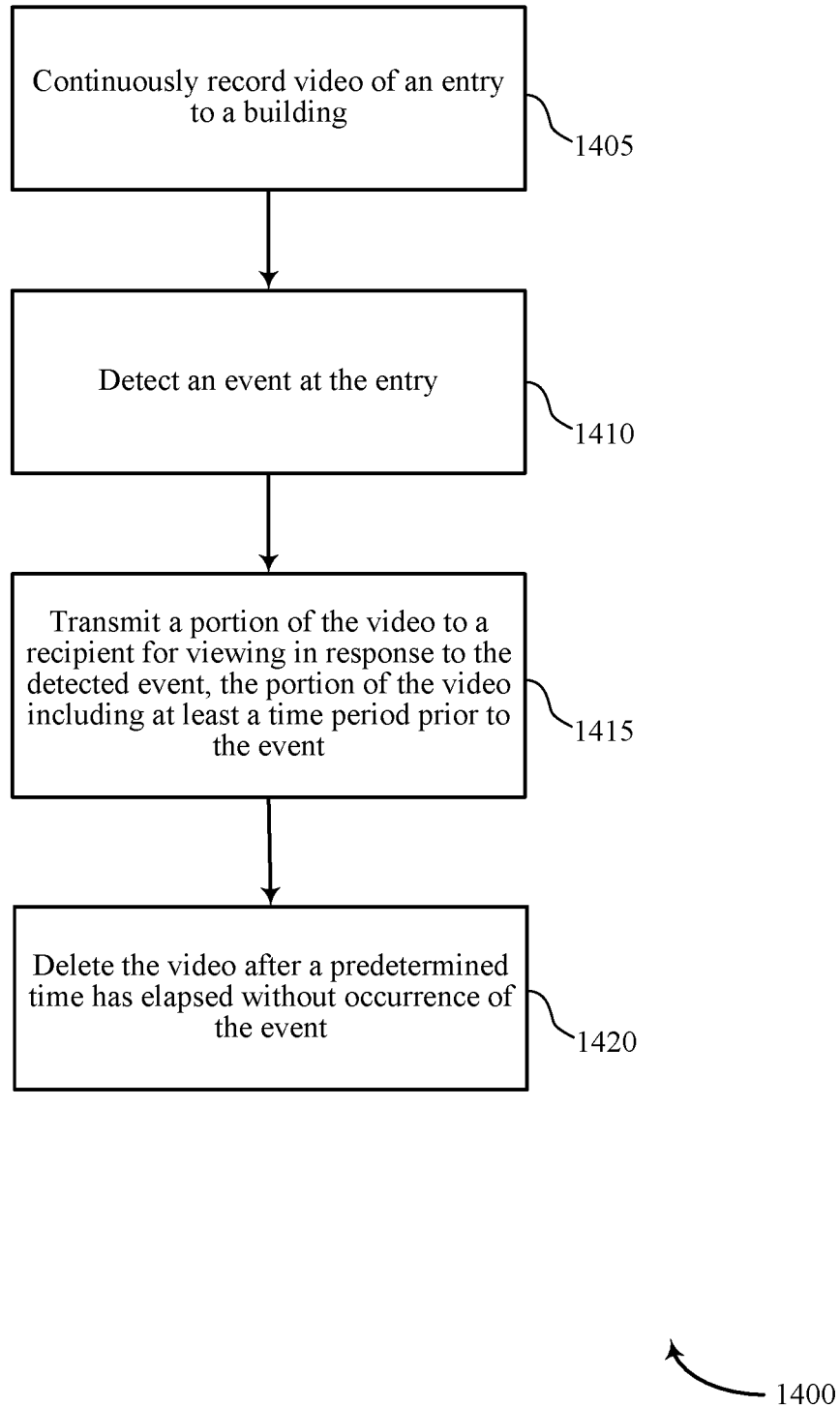

FIG. 14 shows a flow chart illustrating an example of a method 1400 relating to a security and/or an automation system, in accordance with one or more examples of the present disclosure. In some cases, method 1400 may be related to detection of visitors at a building or property, and particular relatively early detection of such visitors, in accordance with various aspects of the present disclosure. For clarity, the method 1400 is described below with reference to examples of one or more of the sensor units 110, local computing device 120, control panel 135, and/or remote computing device 140 as described with reference to at least FIG. 1. In addition, method 1400 is described below with reference to examples of one or more of the device 505 described with reference to at least FIGS. 5-11. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 1405, the method 1400 may include continuously recording video of an entry to a building. The operation at block 1405 may be performed using control panel 135, sensor units 110, doorbell camera unit 405, or devices 505, described with reference to FIGS. 1,4, and 5-11. In some examples, the operation at block 1405 may be performed, additionally or alternatively, using the image collection module as described with reference to FIG. 6.

At block 1410, the method 1400 may include detecting an event at the entry. The operation at block 1505 may be performed using control panel 135, sensor units 110, doorbell camera unit 405, or devices 505, described with reference to FIGS. 1,4, and 5-11. In some examples, the operation at block 1410 may be performed, additionally or alternatively, using the event module as described with reference to FIG. 6.

At block 1415, the method 1400 may include transmitting a portion of the video to a recipient for viewing in response to the detected event, where the portion of the video includes at least a time period prior to the event. The operation at block 1415 may be performed using control panel 135, sensor units 110, doorbell camera unit 405, or devices 505, described with reference to FIGS. 1,4, and 5-11. In some examples, the operation at block 1415 may be performed, additionally or alternatively, using the communication module as described with reference to FIG. 6.

At block 1420, the method 1400 may include deleting the video after a predetermined time has elapsed without occurrence of the event. The operation at block 1420 may be performed using control panel 135, sensor units 110, doorbell camera unit 405, or devices 505, described with reference to FIGS. 1,4, and 5-11. In some examples, the operation at block 1420 may be performed, additionally or alternatively, using the image collection module as described with reference to FIG. 6.

The method 1400 may provide for detection of visitors and related functions using automation/security systems. It should be noted that the method 1400 is just one implementation and that the operations of the method 1400 may be rearranged or otherwise modified such that other implementations are possible.

Figure 15:
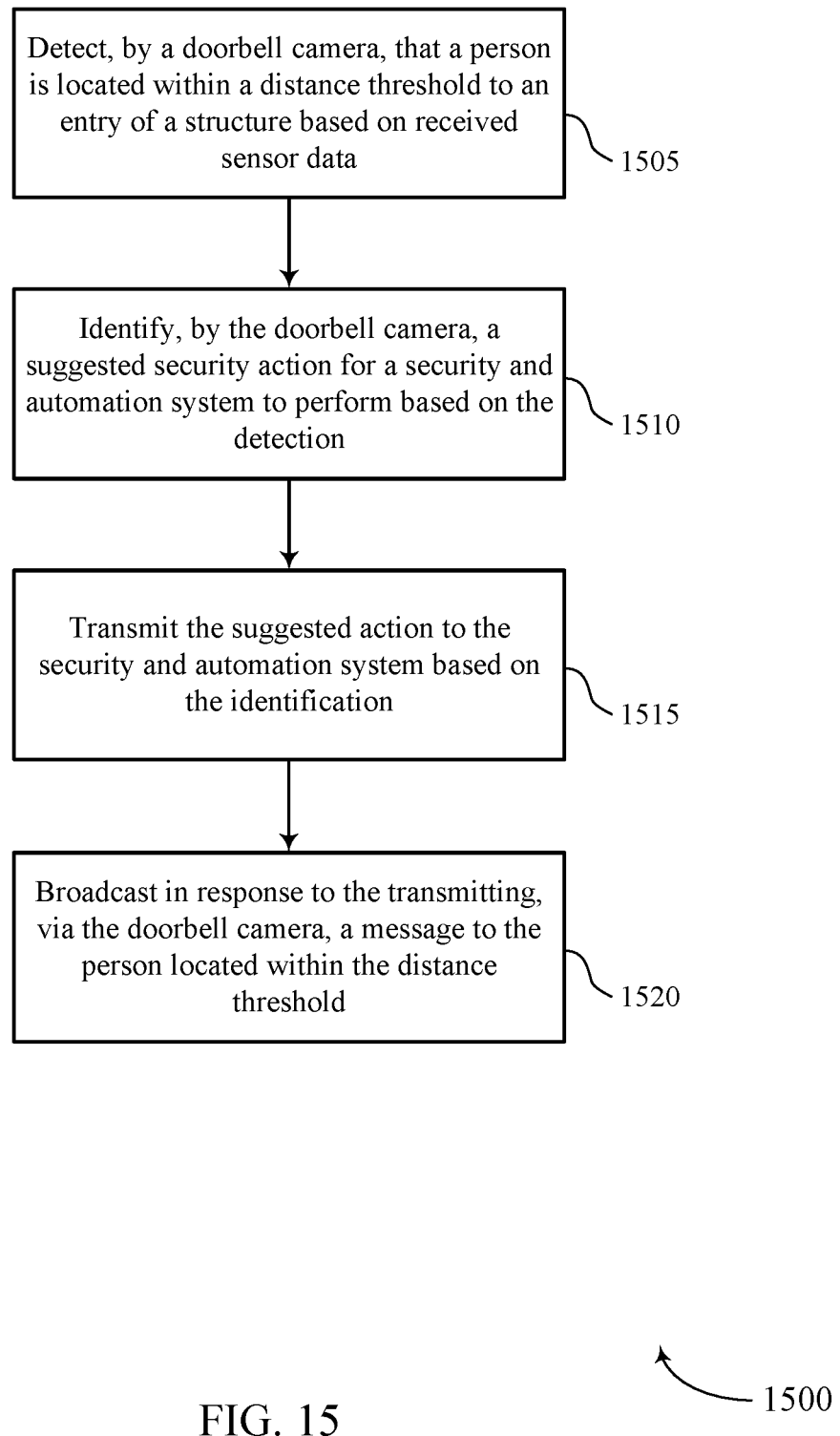

FIG. 15 shows a flow chart illustrating an example of a method 1500 relating to a security and/or an automation system, in accordance with one or more examples of the present disclosure. For clarity, the method 1500 is described below with reference to examples of one or more of the sensor units 110, local computing device 120, control panel 135, and/or remote computing device 140 as described with reference to at least FIG. 1. In addition, method 1500 is described below with reference to examples of one or more of the device 505 described with reference to at least FIGS. 5-11. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 1505, the method 1500 may include detecting, by a doorbell camera, that a person is located within a distance threshold to an entry of a structure based on received sensor data. The operation at block 1505 may be performed using control panel 135, sensor units 110, doorbell camera unit 405, or devices 505, described with reference to FIGS. 1,4, and 5-11. In some examples, the operation at block 1505 may be performed, additionally or alternatively, using the image collection module as described with reference to FIG. 6.

At block 1510, the method 1500 may include identifying, by the doorbell camera, a suggested security action for a security and automation system to perform based on the detection. The operation at block 1510 may be performed using control panel 135, sensor units 110, doorbell camera unit 405, or devices 505, described with reference to FIGS. 1,4, and 5-11. In some examples, the operation at block 1510 may be performed, additionally or alternatively, using the image collection module as described with reference to FIG. 6.

At block 1515, the method 1500 may include transmitting the suggested action to the security and automation system based on the identification. The operation at block 1515 may be performed using control panel 135, sensor units 110, doorbell camera unit 405, or devices 505, described with reference to FIGS. 1,4, and 5-11. In some examples, the operation at block 1515 may be performed, additionally or alternatively, using the communication module as described with reference to FIG. 6.

At block 1520, the method 1500 may include broadcasting in response to the transmitting, via the doorbell camera, a message to the person located within the distance threshold. The operation at block 1520 may be performed using control panel 135, sensor units 110, doorbell camera unit 405, or devices 505, described with reference to FIGS. 1,4, and 5-11. In some examples, the operation at block 1520 may be performed, additionally or alternatively, using the communication module as described with reference to FIG. 6.

Figure 16:
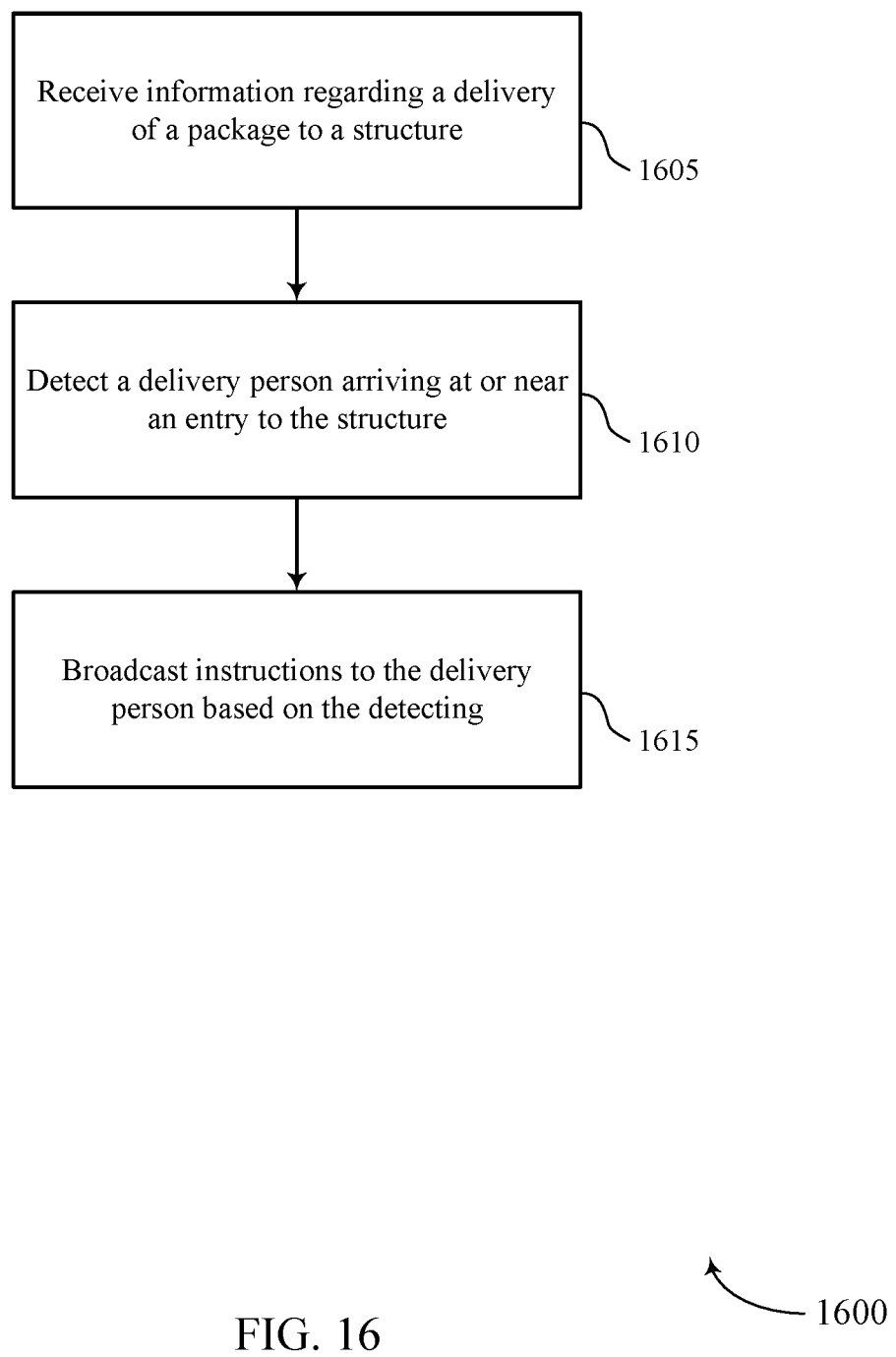

FIG. 16 shows a flow chart illustrating an example of a method 1600 relating to a security and/or an automation system, in accordance with one or more examples of the present disclosure. For clarity, the method 1600 is described below with reference to examples of one or more of the sensor units 110, local computing device 120, control panel 135, and/or remote computing device 140 as described with reference to at least FIG. 1. In addition, method 1600 is described below with reference to examples of one or more of the device 505 described with reference to at least FIGS. 5-11. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 1605, the method 1600 may include receiving information regarding a delivery of a package to a structure. The operation at block 1605 may be performed using control panel 135, sensor units 110, doorbell camera unit 405, or devices 505, described with reference to FIGS. 1,4, and 5-11. In some examples, the operation at block 1605 may be performed, additionally or alternatively, using the event module as described with reference to FIG. 6.

At block 1610, the method 1600 may include detecting a delivery person arriving at or near an entry to the structure. The operation at block 1610 may be performed using control panel 135, sensor units 110, doorbell camera unit 405, or devices 505, described with reference to FIGS. 1,4, and 5-11. In some examples, the operation at block 1610 may be performed, additionally or alternatively, using the image collection module as described with reference to FIG. 6.

At block 1615, the method 1600 may include broadcasting instructions to the delivery person based on the detecting. The operation at block 1615 may be performed using control panel 135, sensor units 110, doorbell camera unit 405, or devices 505, described with reference to FIGS. 1,4, and 5-11. In some examples, the operation at block 1615 may be performed, additionally or alternatively, using the communication module as described with reference to FIG. 6.

Figure 17:
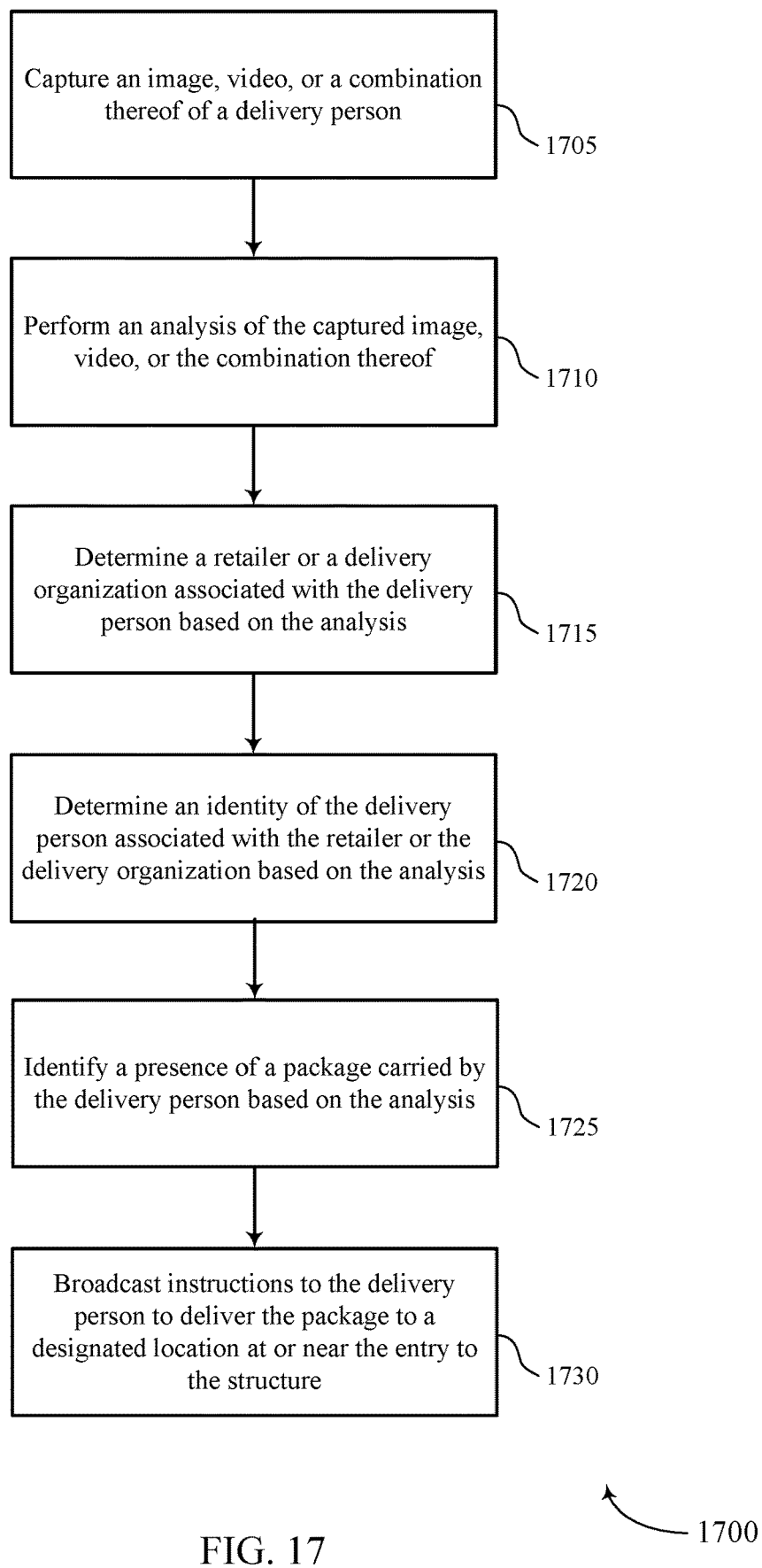

FIG. 17 shows a flow chart illustrating an example of a method 1700 relating to a security and/or an automation system, in accordance with one or more examples of the present disclosure. For clarity, the method 1700 is described below with reference to examples of one or more of the sensor units 110, local computing device 120, control panel 135, and/or remote computing device 140 as described with reference to at least FIG. 1. In addition, method 1700 is described below with reference to examples of one or more of the device 505 described with reference to at least FIGS. 5-11. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 1705, the method 1700 may include capturing an image, video, or a combination thereof of a delivery person. The operation at block 1705 may be performed using control panel 135, sensor units 110, doorbell camera unit 405, or devices 505, described with reference to FIGS. 1, 4, and 5-11. In some examples, the operation at block 1705 may be performed, additionally or alternatively, using the image collection module as described with reference to FIG. 6.

At block 1710, the method 1700 may include performing an analysis of the captured image, video, or the combination thereof. The operation at block 1710 may be performed using control panel 135, sensor units 110, doorbell camera unit 405, or devices 505, described with reference to FIGS. 1, 4, and 5-11. In some examples, the operation at block 1710 may be performed, additionally or alternatively, using the image collection module or package detection module as described with reference to FIG. 6.

At block 1715, the method 1700 may include determining a retailer or a delivery organization associated with the delivery person based on the analysis. The operation at block 1715 may be performed using control panel 135, sensor units 110, doorbell camera unit 405, or devices 505, described with reference to FIGS. 1, 4, and 5-11. In some examples, the operation at block 1715 may be performed, additionally or alternatively, using the image collection module or package detection module as described with reference to FIG. 6.

At block 1720, the method 1700 may include determining an identity of the delivery person associated with the retailer or the delivery organization based on the analysis. The operation at block 1720 may be performed using control panel 135, sensor units 110, doorbell camera unit 405, or devices 505, described with reference to FIGS. 1, 4, and 5-11. In some examples, the operation at block 1720 may be performed, additionally or alternatively, using the image collection module or package detection module as described with reference to FIG. 6.

At block 1725, the method 1700 may include identifying a presence of a package carried by the delivery person based on the analysis. The operation at block 1725 may be performed using control panel 135, sensor units 110, doorbell camera unit 405, or devices 505, described with reference to FIGS. 1,4, and 5-11. In some examples, the operation at block 1725 may be performed, additionally or alternatively, using the image collection module or package detection module as described with reference to FIG. 6.

At block 1730, the method 1700 may include broadcasting instructions to the delivery person to deliver the package to a designated location at or near the entry to the structure. The operation at block 1730 may be performed using control panel 135, sensor units 110, doorbell camera unit 405, or devices 505, described with reference to FIGS. 1,4, and 5-11. In some examples, the operation at block 1730 may be performed, additionally or alternatively, using the package detection module or communication module as described with reference to FIG. 6.

In some examples, aspects from two or more of the methods 1200-1700 may be combined and/or separated. It should be noted that the methods 1200-1700 are just example implementations, and that the operations of the methods 1200-1700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method of monitoring an entry to a structure for a security and automation system using a doorbell camera component, comprising:

initiating, at a doorbell camera of the doorbell camera component, an image capture comprising one or more images of a configured area at or near the entry of the structure, the initiating prior to detecting, by one or more integrated sensors of the doorbell camera component, a first person proximal to the doorbell camera, wherein the initiating is based at least in part on receiving a first set of sensor data via one or more integrated sensors external to the structure and distinct from hardware of the doorbell camera;

detecting, by the one or more integrated sensors of the doorbell camera component, the first person is within a distance threshold to the entry of the structure and performing a physical interaction at or near the doorbell camera component;

selecting, by a module of the doorbell camera component, a subset of the one or more images of the configured area, wherein the subset of the one or more images is associated with a time stamp following the initiating and preceding the detecting and correspond to a field of view (FOV) for the doorbell camera;

establishing, by the module of the doorbell camera component, a suggested security action for the security and automation system to perform based at least in part on the detecting and evaluating at least a portion of the subset of the one or more images;

transmitting the suggested security action to the security and automation system following the establishing;

identifying, by the module of the doorbell camera component, a second person within the structure based at least in part on a tracked location and action of the second person within the structure, wherein the tracked location and action of the second person is based at least in part on receiving a second set of sensor data via one or more integrated sensors within the structure and distinct from hardware of the doorbell camera;

iteratively broadcasting, via a speaker of the doorbell camera component in response to the identifying, a message to the first person for a configured number of iterations within a predetermined duration, wherein the broadcasting is based at least in part on the tracked location and action of the second person, wherein the broadcasting comprises receiving a written message; converting the written message into an audio message; and the broadcasting the audio message at or near the entry to the structure;

identifying an email delivery confirmation;

identifying a tracking number in the email delivery confirmation; and confirming a validity of the email delivery confirmation and the tracking number based at least in part on performing an analysis of the tracking number.

2. The method of claim 1, wherein detecting the first person or the physical interaction of the first person proximal to the doorbell camera further comprises:

comparing, by the module of the doorbell camera component, the first set of sensor data to a set of predetermined profiles associated with the structure;

determining an identity of the first person based at least in part on the comparing; and transmitting a notification indicating the identity of the first person.

3. The method of claim 2, wherein the first set of sensor data comprises at least one of sensed motion proximal to the structure of sensed sound proximal.

4. The method of claim 1, wherein the suggested security action comprises at least one of establishing a communication session between a remote device and a communication device associated with the doorbell camera at or near the entry of the structure; turning a fight on or off at the structure; locking or unlocking a door at the structure; turning an alarm on or off at the structure; or a combination thereof.

5. The method of claim 1, further comprising:

the broadcasting the message at or near the entry to the structure after a predetermined duration based at least in part on the detecting, wherein the broadcasting the message corresponds to a first iteration of the configure number of iterations.

6. The method of claim 1, further comprising:

identifying a presence of an object at or near the entry to the structure based at least in part on the first set of sensor data; and broadcasting the message at or near the entry to the structure based at least in part on the presence of the object, wherein broadcasting the message corresponds to a first iteration of the configure number of iterations.

7. The method of claim 1, further comprising:

transmitting a request to the first person after a predetermined duration based at least in part on the detecting, the request comprising an indication to record a message based at least in part on the tracked location and action of the second person within the structure, wherein transmitting the request.

8. The method of claim 1, wherein the message comprises at least one of an audio message, a video message, or a combination thereof.

9. The method of claim 1, further comprising:

receiving information regarding a delivery of a package to the structure;

detecting the first person arriving at or near the entry to the structure; and broadcasting instructions to the first person based at least in part on the detecting.

10. The method of claim 9, wherein the analysis of the tracking number comprises:

identifying a retailer or a delivery organization associated with the tracking number;

comparing the tracking number to a remote tracking number database associated with the retailer or the delivery organization; and identifying a match between the tracking number associated with the email delivery confirmation and at least one tracking number associated with the remote tracking number database.

11. The method of claim 9, wherein detecting the first person further comprises:

capturing an image, video, or a combination thereof of the first person;

performing an analysis of the captured image, video, or the combination thereof;

determining a retailer or a delivery organization associated with the first person based at least in part on the analysis; and determining an identity of the first person associated with the retailer or the delivery organization based at least in part on the analysis.

12. The method of claim 11, further comprising:

identifying a presence of the package carried by the first person based at least in part on the analysis, wherein the broadcasting comprises instructions to the first person to deliver the package to a designated location at or near the entry to the structure, and wherein the instructions are pre-recorded, custom text, or a combination thereof.

13. A doorbell camera component for monitoring an entry to a structure of a security and automation system, comprising:

a processor;

memory in electronic communication with the processor; and instructions stored in the memory, the instructions being executable by the processor to: initiate, at a doorbell camera of the doorbell camera component, an image capture comprising one or more images of a configured area at or near the entry of the structure, the initiating prior to detecting, by one or more integrated sensors of the doorbell camera component, a first person proximal to the doorbell camera, wherein the initiating is based at least in part on receiving a first set of sensor data via one or more integrated sensors external to the structure and distinct from hardware of the doorbell camera;

detect, by the one or more integrated sensors of the doorbell camera component, the first person is within a distance threshold to the entry of the structure and performing a physical interaction at or near the doorbell camera component;

select, by a module of the doorbell camera component, a subset of the one or more images of the configured area, wherein the subset of the one or more images is associated with a time stamp following the initiating and preceding the detecting and correspond to a field of view (FOV) for the doorbell camera;

establish, by the module of the doorbell camera component, a suggested security action for the security and automation system to perform based at least in part on the detecting and evaluating at least a portion of the subset of the one or more images;

transmit the suggested security action to the security and automation system following the establishing;

identify, by the module of the doorbell camera component, a second person within the structure based at least in part on a tracked location and action of the second person within the structure, wherein the tracked location and action of the second person is based at least in part on receiving a second set of sensor data via one or more integrated sensors within the structure and distinct from hardware of the doorbell camera;

iteratively broadcast, via a speaker of the doorbell camera component in response to the identifying, a message to the first person for a configured number of iterations within a predetermined duration, wherein the broadcasting is based at least in part on the tracked location and action of the second person, wherein the broadcasting comprises receiving a written message; converting the written message into an audio message; and the broadcasting the audio message at or near the entry to the structure;

identify an email delivery confirmation;

identify a tracking number in the email delivery confirmation; and confirm a validity of the email delivery confirmation and the tracking number based at least in part on performing an analysis of the tracking number.

14. A non-transitory computer-readable medium storing computer-executable code for a doorbell camera component of security and automation systems, the code executable by a processor to:

initiate, at a doorbell camera of the doorbell camera component, an image capture comprising one or more images of a configured area at or near the entry of the structure, the initiating prior to detecting, by one or more integrated sensors of the doorbell camera component, a first person proximal to the doorbell camera, wherein the initiating is based at least in part on receiving a first set of sensor data via one or more integrated sensors external to the structure and distinct from hardware of the doorbell camera;

detect, by the one or more integrated sensors of the doorbell camera component, the first person is within a distance threshold to the entry of the structure and performing a physical interaction at or near the doorbell camera component;

select, by a module of the doorbell camera component, a subset of the one or more images of the configured area, wherein the subset of the one or more images is associated with a time stamp following the initiating and preceding the detecting and correspond to a field of view (FOV) for the doorbell camera;

establish, by the module of the doorbell camera component, a suggested security action for the security and automation system to perform based at least in part on the detecting and evaluating at least a portion of the subset of the one or more images;

transmit the suggested security action to the security and automation system following the establishing;

identify, by the module of the doorbell camera component, a second person within the structure based at least in part on a tracked location and action of the second person within the structure, wherein the tracked location and action of the second person is based at least in part on receiving a second set of sensor data via one or more integrated sensors within the structure and distinct from hardware of the doorbell camera;

iteratively broadcast, via a speaker of the doorbell camera component in response to the identifying, a message to the first person for a configured number of iterations within a predetermined duration, wherein the broadcasting is based at least in part on the tracked location and action of the second person, wherein the broadcasting comprises receiving a written message; converting the written message into an audio message; and the broadcasting the audio message at or near the entry to the structure;

identify an email delivery confirmation;

identify a tracking number in the email delivery confirmation; and confirm a validity of the email delivery confirmation and the tracking number based at least in part on performing an analysis of the tracking number.

* * * * *